United States Patent
Freishtat et al.

(10) Patent No.: US 8,244,635 B2
(45) Date of Patent: Aug. 14, 2012

(54) SYSTEM AND METHOD FOR SYNDICATED COLLECTION, AGGREGATION AND DELIVERY OF PERSONAL DATA

(75) Inventors: Gregg Freishtat, Atlanta, GA (US); Vikas Rijsinghani, Atlanta, GA (US)

(73) Assignee: Yodlee.com, Inc., Redwood City, CA (US)

(*) Notice: Subject to any disclaimer, the term of this patent is extended or adjusted under 35 U.S.C. 154(b) by 1317 days.

(21) Appl. No.: 09/839,735

(22) Filed: Apr. 20, 2001

(65) Prior Publication Data

US 2001/0037294 A1     Nov. 1, 2001

Related U.S. Application Data

(60) Provisional application No. 60/199,609, filed on Apr. 25, 2000.

(51) Int. Cl.
*G06Q 40/00* (2012.01)
(52) U.S. Cl. .......................... 705/40; 705/39
(58) Field of Classification Search .................. 709/218; 705/35, 40, 39
See application file for complete search history.

(56) References Cited

U.S. PATENT DOCUMENTS

| | | | | | |
|---|---|---|---|---|---|
| 5,724,567 | A | * | 3/1998 | Rose et al. | 707/2 |
| 5,852,812 | A | * | 12/1998 | Reeder | 705/39 |
| 5,862,325 | A | * | 1/1999 | Reed et al. | 709/201 |
| 5,978,779 | A | * | 11/1999 | Stein et al. | 705/37 |
| 5,987,440 | A | * | 11/1999 | O'Neil et al. | 705/44 |
| 5,995,965 | A | * | 11/1999 | Experton | 707/10 |
| 6,061,057 | A | * | 5/2000 | Knowlton et al. | 345/744 |
| 6,070,150 | A | * | 5/2000 | Remington et al. | 705/34 |
| 6,128,603 | A | * | 10/2000 | Dent et al. | 705/40 |
| 6,182,142 | B1 | * | 1/2001 | Win et al. | 709/229 |
| 6,185,567 | B1 | * | 2/2001 | Ratnaraj et al. | 707/10 |
| 6,233,318 | B1 | * | 5/2001 | Picard et al. | 379/88.17 |
| 6,272,528 | B1 | * | 8/2001 | Cullen et al. | 709/202 |
| 6,278,993 | B1 | * | 8/2001 | Kumar et al. | 707/708 |

(Continued)

FOREIGN PATENT DOCUMENTS

JP     2000235514 A  *  4/2000

OTHER PUBLICATIONS

Yodlee.com, Inc., Web site printout from http://web.archive.org dated Mar. 4, 2000. Copyright 1999, 2000 Yodlee.com, Inc.*

(Continued)

*Primary Examiner* — Hani M Kazimi
(74) *Attorney, Agent, or Firm* — Donald R. Boys; Central Coast Patent Agency, Inc.

(57) ABSTRACT

A personal information collection and delivery system has a collection component executed by a first enterprise, for collecting information for specific individuals from a plurality of information provider's sites, an aggregation component executed by the first enterprise, for aggregating and storing the collected information identified for individual ones of the specific individuals; and a plurality of delivery components executed by a like plurality of second enterprises, for delivering said aggregated information to the specific individuals. This system is characterized in that delivery is distinguished to individual ones of the second enterprises. In some cases the information providers are the second enterprises that manage delivery, in which case they may limit access according to a variety of variables. Also in some cases the providers also provide transactions services, and the specific individuals connecting through the system may accomplish transactions, which may include drag-and-drop implementation.

7 Claims, 16 Drawing Sheets

U.S. PATENT DOCUMENTS

| | | | | |
|---|---|---|---|---|
| 6,317,783 | B1 * | 11/2001 | Freishtat et al. | 709/218 |
| 6,405,245 | B1 * | 6/2002 | Burson et al. | 709/217 |
| 6,421,708 | B2 * | 7/2002 | Bettis | 709/206 |
| 6,442,590 | B1 * | 8/2002 | Inala et al. | 709/204 |
| 6,460,036 | B1 * | 10/2002 | Herz | 707/10 |
| 6,571,279 | B1 * | 5/2003 | Herz et al. | 709/217 |
| 6,578,015 | B1 * | 6/2003 | Haseltine et al. | 705/34 |
| 6,581,102 | B1 * | 6/2003 | Amini et al. | 709/231 |
| 6,609,113 | B1 * | 8/2003 | O'Leary et al. | 705/39 |
| 6,738,815 | B1 * | 5/2004 | Willis et al. | 709/225 |
| 2001/0054155 | A1 * | 12/2001 | Hagan et al. | 713/193 |
| 2002/0007330 | A1 * | 1/2002 | Kumar et al. | 705/36 |
| 2002/0046160 | A1 * | 4/2002 | Conwell, III | 705/39 |
| 2003/0005033 | A1 * | 1/2003 | Mohan et al. | 709/202 |
| 2003/0110076 | A1 * | 6/2003 | Holt | 705/14 |
| 2003/0154171 | A1 * | 8/2003 | Karp et al. | 705/78 |
| 2004/0088381 | A1 * | 5/2004 | Borman et al. | 709/219 |
| 2004/0138995 | A1 * | 7/2004 | Hershkowitz et al. | 705/38 |

OTHER PUBLICATIONS

Krushenisky, C., Making the Smart Investment in Personal Finance Software, Mar. 1994, Working At HOme, vol. 5, Issue 3.*

David Hallerman. "All data, all the time." Bank Technology News Mar. 1, 2000: Banking Information Source, ProQuest.*

Business Editors/High-Tech Writers. "Yodlee.com Launches a Powerful, New Consumer Service to Help You Take Control of Your Life Online; Provides Instant Access to all Your Personal Accounts." Business Wire Sep. 28, 1999.*

* cited by examiner

SYSTEM AND METHOD FOR SYNDICATED COLLECTION, AGGREGATION AND DELIVERY OF PERSONAL DATA

CROSS-REFERENCE TO RELATED DOCUMENTS

The present application is a non-provisional patent application claiming priority to Provisional application 60/199,609 filed on Apr. 25, 2000.

FIELD OF THE INVENTION

The present invention is in the area of Internet-implemented information collection and aggregation services, and pertains in particular to services provided by one enterprise for a plurality of other enterprises, while allowing the second enterprises to control format and content of delivery, including implementing transactions.

BACKGROUND OF THE INVENTION

The present invention is in the area of Internet-implemented information collection and aggregation services, and pertains in particular to services provided by one enterprise for a plurality of other enterprises, while allowing the second enterprises to control format and content of delivery, including implementing transactions.

Through a number of techniques and computer architecture, much of which is subject matter of the above referenced Provisional application 60/199,609, aggregating end user account data is taught for normalization and presentation to end users through a growing syndicate of destination sites as described in greater detail below. As of this writing, on behalf of end users, first enterprises provide a service which maintains a large number of aggregated accounts from many second enterprises, such as service providers in the bank, brokerage, credit card, reward program, bills and email verticals. FIGS. 12 through 16 in this application illustrate a novel improvement to current account aggregation technology—a Syndicated Transactions Network. FIGS. 12-16 in conjunction with detailed description herein provide a detailed description of this invention.

Currently account aggregation is often effected through a procedure known colloquially as "screen scraping." Internet Protocol and XML, among other procedures, enables Yodlee.com to harvest information of relevance to the end user. The Yodlee.com service is designed in part to keep the information provider engaged with its customer (for example, the service takes customers back to the information provider's site to allow the customer to transact in his account). the present inventors, however, have invented a solution that will improve upon the screen scraping-only model of aggregation by affording an even greater amount of engagement for the information provider with its customer and for the other reasons set forth below.

e-Finance Transaction Platform

Yodlee.com, according to embodiments of the present invention described in enabling detail below, has devised a novel improvement to existing account aggregation and transacting service that will (i) allow financial institutions to syndicate more effectively their Web strategies and transactional capabilities and (ii) place control over the customer relationship completely in the hands of the financial institutions or other information provider.

The technology paradigm of almost every financial institution today is a series of back-end host systems containing customer data communicating through a "business logic" or "rules" layer that allows certain kinds of transactions to occur. These transactions are then published on the Web through Web servers which may be provided by a number of hardware suppliers. A common denominator in virtually all of these implementations is the last link in the chain, the Web server connecting the institution to its customer on the Internet.

The present inventors have invented a provider-side syndication and filtering platform that will be delivered to providers as a software development kit ("SDK") or other suitable implementation format made available to any provider desiring to control its customers' remote interactions online. This unique platform consists of a rules-based filter developed preferably as a servlet, but other embodiments may utilize other commonly known server extension technologies, allowing customers varying levels of access and transactional capability depending on a number of variables, such as who the user is, and from where the user accesses the account from the Web. The platform in some embodiments will utilize powerful internal and external directory services developed by leading computer networking vendors. It is expected that the filtering layer would ship with each Web server distributed by such a supplier. Combined with Yodlee.com's unique positioning in the financial institution marketplace, this approach would allow the company to rapidly seed the market for this service. The solution is referred to herein as an "e-Finance Transaction Platform" or (ETP).

The ETP has several important effects from the perspective of the financial services provider. First, as noted above, it allows the provider institution to give users different degrees of data and transacting capability depending upon the site from which the user accesses the institution. Through the rules embedded in the filtering platform, the institution is able, for example, to give the user (i) full access to the user's account (including full transactional capability) if the user accesses the account through the institution's site, (ii) somewhat less data and transactional capability if the user accesses the institution from, for example, a non-affiliated Web portal, (iii) less data and less transactional capability still if the user accesses the institution from a competitive money management site and (iv) very limited and/or no data and access if the user accesses the account from a competitive banking property. The ETP effectively allows the provider institution to gain significant control of the customer's remote Web experience.

Second, the ETP promotes a level of financial standardization and customer convenience as yet unrecognized among Web properties. The ETP, if embedded in Web servers, permits fully integrated "drag and drop" transactions to be conducted through a user-friendly graphical user interface on a client computer. For example, it is possible through an embodiment of the invention to purchase merchandise or pay a bill online by dragging currency from an online accessible checking account to an online retailer or bill presenter. The communication between the bank and either the retailer or bill presenter is transparent to the user.

Third, the ETP gives the financial institutions a far more effective vehicle for syndicating their online strategies than they have had heretofore. Financial Institutions are increasingly aware that online banking or brokerage services alone are not sufficient to maintain a meaningful share of attention from a large percentage of their customers. Such institutions need an effective transaction syndication vehicle to touch a high percentage of their customers who are not presently engaging with the institution at its own Web site.

Fourth, unlike the situation now existing with account aggregation, the platform will permit the provider institution to maintain a direct marketing relationship with its customer, knowing, for example, what types of activities the customer is conducting at the institution when the institution is accessed from a destination site other than the institution itself. This arrangement will be both more reliable (in terms of data integrity) and more auditable than any known current forms of account aggregation.

Given financial institutions' concerns about screen scraping, the inventors believe that financial institutions will be very receptive to this proposition, and will desire to regain control of the customer experience through access to the ETP. From a technology partner's perspective, this mechanism will give the technology partner an opportunity to participate in the recurring revenue stream available from financial transactions, rather than simply publishing data from financial institutions on the Web through its server network.

The concept for the ETP is born of both real and perceived shortcomings of screen scraping. The ETP may eventually obviate the need for any sort of widespread screen scraping of information providers, because information will be provided directly to the ETP (subject to the permission levels described above) by the information providers. For information providers that choose not to subscribe to the ETP, Yodlee.com will continue to offer aggregated information collected through its proprietary screen scraping technology, also described below.

Information on Scraping Technology

Looking back, it is apparent that as the Internet has gained momentum, consumers have demanded applications or services that make their online experience simpler, easier to use, and more satisfying. The development of successful Internet sites has typically corresponded with a number of themes which have developed over the last few years. When carefully analyzed, this evolution is a logical development of the emerging digital economy.

Prior to 1994 the Internet was not a mass media, in part because the existing technologies (such as FTP, Archie, Usenet, and Gopher) were not user friendly and required the end user to do all of the work (e.g., the end user had to learn of an existing data source, find the address, navigate to the destination, and download the information). As more consumers began accessing the Internet, Search Engines were created to solve this usability issue. With the advent of the commercial Search Engine, additional content could be easily added to the Internet and the end user had a means of finding and accessing this information. But consumers required better tools than Search Engines for organizing and accessing this wealth of generic content. Push technologies were explored, and eventually, the portal strategy was successfully adopted as an efficient way for consumers to easily access a variety of content sources in a single, easy to use format. As the volume of available online content continues to grow exponentially, portals are now confronted with the need to make different types of content available to different consumers based upon their particular preferences and tastes.

The phenomenal success of Internet portals and destination sites has demonstrated the importance of creatively and intelligently aggregating, organizing and presenting the mass of information available on the Web. Search engines, portals and destination sites have Internet strategies based on the frequency, duration and quality of end user visits to their sites. For this reason, destination sites and portals are constantly seeking content and/or technologies which drive quality traffic to their sites and keep it there. Recent trends indicate that Internet users are up to 25 times more likely to come back to a site when this information is organized according to personal preferences.

FIG. 1 displays the current process of acquiring online PI 100. The end user first selects an information provider site in step 110. The end user proceeds to step 120 by locating and entering the Internet address of the selected information provider. This step may be accomplished in several manners with varying levels of complexity. A simple means for accomplishing this step is the utilization of a bookmark or favorite whereas locating an information provider for the first time might involve significant time and effort performing online searches. In step 130, the end users logs into the selected information provider's Web site utilizing the site's specific logon protocol. This protocol usually involves verifying the identity of the end user using a user name and password or other means of verification, acquiring the verification data from cookies residing on the end user's system or a combination of requested data and cookie data. The end user continues in step 140 by navigating through Web pages on the information provider's Web site until the desired information is located. During this process, the end user is often required to visit Web pages of little or no use to the end user whose goals is to simply acquire the particular PI residing on the Web site. Ultimately in step 150, the end user is presented with the desired PI. The entire process 100 is repeated for each individual piece of PI desired by the end user. Under this PI access model, the end user must visit each separate information provider, track potentially different identity verification data for each, utilize a different user interface at each site and possibly wade through a significant number of filler Web pages.

FIG. 4 pictorial illustrates the architecture of this current access process. The end user 210 utilizes the client computer 220 to access each PI Web site 250 across the Internet 230. This current model suffers from several significant deficiencies. The end user must login to each site separately. Each separate site has its own graphical user interface. Each site wants the end user to stay and return; each visited site wants to retain end user focus for as long as possible. No true aggregation of PI exists; multiple accesses simply allow sequential access to particular pieces of PI.

One partial solution to these problems has recently evolved in the form of portal sites. Generic portal sites aggregate resources into categories and provide links to sites covering topics within those categories. Yahoo and Excite are examples of generic portal sites. These sites facilitate horizontal aggregation of generic content; horizontal aggregation refers to aggregation of PI access within a particular information provider category such as banks or utility companies. Some portal sites allow individual end users a limited capability to select and configure disparate generic PI. Generic PI refers to PI of interest to the particular end user that does not require specific identity verification to obtain. For example, an end user might be interested in the weather forecast for his local area. This information could be integrated into a portal page without requiring identity verification of the particular end user receiving this PI. The individualized portal page provides a significant benefit to users seeking to aggregate generic PI. However, current portal pages do not generally provide PI requiring identity verification such as an end user's stock portfolio or bank balance. Further, these pages do not facilitate transactions utilizing PI.

Under current technology, aggregating PI available over the Internet requires a significant burden in terms of time, effort and learning curve. An end user wishing to access his PI needs to individually visit a variety of information provider sites each with its own requirements, graphical user interface and login protocol.

SUMMARY OF THE INVENTION

In a preferred embodiment of the present invention a personal information collection and delivery system is provided, comprising a collection component executed by a first enterprise, for collecting information for specific individuals from a plurality of information provider's sites, an aggregation component executed by the first enterprise, for aggregating and storing the collected information identified for individual ones of the specific individuals, and a plurality of delivery components executed by a like plurality of second enterprises, for delivering said aggregated information to the specific individuals. The system in this embodiment is characterized in that delivery is distinguished to individual ones of the second enterprises.

In preferred embodiments the system is implemented in the Internet network, and delivery is accomplished following software routines prepared for individual ones of the second enterprises. In some instances delivery is accomplished by individual ones of the second enterprises via one or more of wireless networks to one or more wireless appliances, or by cable to cable-ready set-top-boxes or television appliances. Also in some cases the information collected and delivered is personal information requiring secure identification of the specific individuals to the information provider's sites.

In another aspect of the invention a method for collecting and delivering personal information is provided, comprising the steps of (a) collecting information for specific individuals from a plurality of information provider's sites by a collection component executed by a first enterprise; (b) aggregating and storing the collected information identified for individual ones of the specific individuals by executing an aggregation component by the first enterprise; and (c) delivering said aggregated information to said specific individuals by a plurality of delivery components executed by a plurality of second enterprises, wherein delivery is distinguished to individual ones of the second enterprises.

In some embodiments of the method the system is implemented in the Internet network, and delivery is accomplished following software routines prepared for individual ones of the second enterprises. Also in some embodiments delivery is accomplished by individual ones of the second enterprises via one or more of wireless networks to one or more wireless appliances, or by cable to cable-ready set-top-boxes or television appliances. In some of these cases the information collected and delivered is personal information requiring secure identification of the specific individuals to the information provider's sites.

In another aspect of the invention a personal information system is provided, comprising a collection component executed by a first enterprise, for collecting information for specific individuals from a plurality of second enterprises as information providers, an aggregation component executed by the first enterprise, for aggregating and storing the collected information identified for individual ones of the specific individuals, and a plurality of delivery components managed by individual ones of the second enterprises, for delivering said aggregated information to the specific individuals. This system is characterized in that delivery is distinguished to individual ones of the second enterprises.

In preferred embodiments this system is also implemented in the Internet network, and delivery is accomplished following software routines prepared by or for individual ones of the second enterprise information providers. In some cases the information collected and delivered is personal information requiring secure identification of the specific individuals to the information provider's sites. Also in some cases individual information providers limit access to aggregated information according to variables including the origination site used by a specific individual requesting information.

In some preferred embodiments of this system individual ones of the second enterprises provide transaction services to individual ones of the specific individuals connecting to the individual ones of the second enterprises through the system. The range of transaction services includes a user interface enabling a specific individual to access an account and transfer funds from the account for payment to a third party. In some cases drag-and-drop protocol is implemented for fund transfers.

In yet another aspect of the invention a method for collecting and delivering personal information is provided, comprising the steps of (a) collecting information for specific individuals by a collection component executed by a first enterprise, from a plurality of second enterprises as information providers; (b) aggregating and storing the collected information identified for individual ones of the specific individuals by executing an aggregation component by the first enterprise; and (c) delivering said aggregated information to said specific individuals by a plurality of delivery components managed by said second enterprises, wherein delivery is distinguished to individual ones of the second enterprises.

In some embodiments the method is practiced in the Internet network, wherein delivery is accomplished following software routines prepared by or for individual ones of the second enterprise information providers. Also in some embodiments the information collected and delivered is personal information requiring secure identification of the specific individuals to the information provider's sites. Providers may limit access to aggregated information according to variables including the origination site used by a specific individual requesting information.

In some preferred embodiments individual ones of the second enterprises provide transaction services to individual ones of the specific individuals connecting to the individual ones of the second enterprises through the system, and the interface may enable a specific individual to access an account and transfer funds from the account for payment to a third party. The transfers enabled may include drag-and-drop protocol.

In yet another aspect of the invention a personal information and transaction system is provided, comprising a collection component executed by a first enterprise, for collecting information for specific individuals from a plurality of second enterprises as information providers, an aggregation component executed by the first enterprise, for aggregating and storing the collected information identified for individual ones of the specific individuals, and a plurality of transaction components distinguished to individual ones of the second enterprises, for enabling transactions to be managed by individual ones of the specific individuals. This transaction system is characterized in that the individual ones of the second enterprises publish transaction protocols to the first enterprise, which then provides transaction protocol to the individual ones of the specific individuals, allowing transactions at the second enterprises to be managed by the specific individuals through the system.

In preferred embodiments the transaction system is implemented in the Internet network, wherein transactions are managed through Internet interaction between the specific individuals and the second enterprises, the Internet interaction through sites of the first enterprise. Also in preferred embodiments the transaction services include a user interface enabling a specific individual to access an account and transfer funds from the account for payment to a third party. In some cases drag-and-drop protocol is implemented for fund transfers.

In still another aspect a method for enabling transactions at commercial institutions by specific individuals is provided, comprising the steps of (a) collecting information for specific individuals from the commercial institutions by a collection component executed by a first enterprise; (b) aggregating the collected information identified for individual ones of the specific individuals by an aggregation component executed by the first enterprise; and (c) executing by the first enterprise individual ones of a plurality of transaction components distinguished to individual ones of the commercial institutions, enabling thereby transactions to be managed by individual ones of the specific individuals.

In preferred embodiments the transaction components are published to the first enterprise by the commercial institutions. Also in preferred embodiments the components are implemented in the Internet network, and transactions are managed through Internet interaction between the specific individuals and the second enterprises, the Internet interaction through Internet sites of the first enterprise. In preferred embodiments the transaction services include a user interface enabling a specific individual to access an account and transfer funds from the account for payment to a third party. Also in preferred cases drag-and-drop protocol is implemented for fund transfers.

In embodiments of the invention taught in enabling detail below, for the first time a central collection and aggregation service may perform such services for a plurality of institutions, such as financial institutions, while also allowing the individual institutions to control the access to and delivery of information, as well as enabling transaction services commanded by end users to the providing institutions.

DESCRIPTION OF THE PREFERRED EMBODIMENTS

Figure 1:
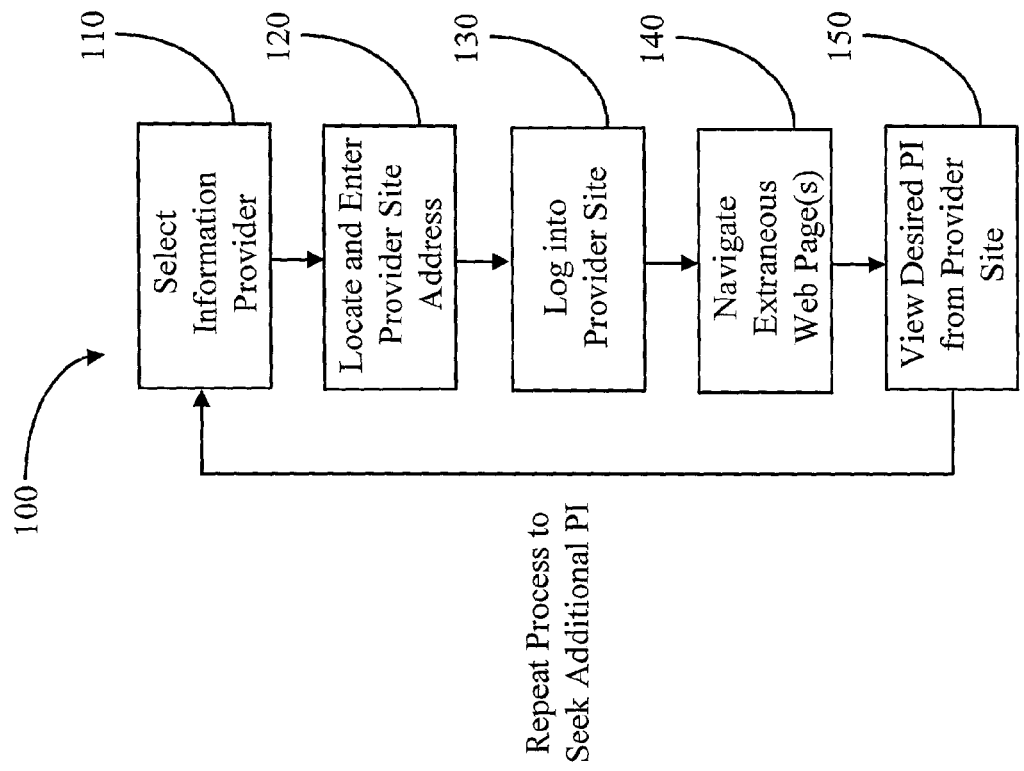
FIG. 1 is a process diagram of the current process that end users perform to access Internet available PI.

Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

In no time, end users will have to log into a large number of different Web Sites, each with separate passwords, security, rules, software and "look and feel"—just to get the information currently obtained by checking one place—the mailbox at the end of the driveway. The Internet will fundamentally change the way in which end users will access Personal Information (PI) and will make e-commerce as familiar as using an ATM. "Personal Information" is all of the data that companies, information providers, have that is specific or unique to each person such as monthly bills, bank account balances, investments information, health care benefits, email, voice and fax messages, 401(k) holdings or potentially any other information pertinent to a particular end user.

The present invention alleviates several of the problems with the current PI acquisition methods by automatically aggregating PI, not only generic PI as aggregated by portals but also PI specific to the end user requiring identity verification for access. In one embodiment, the invention automates the PI acquisition and delivery process.

Figure 2:
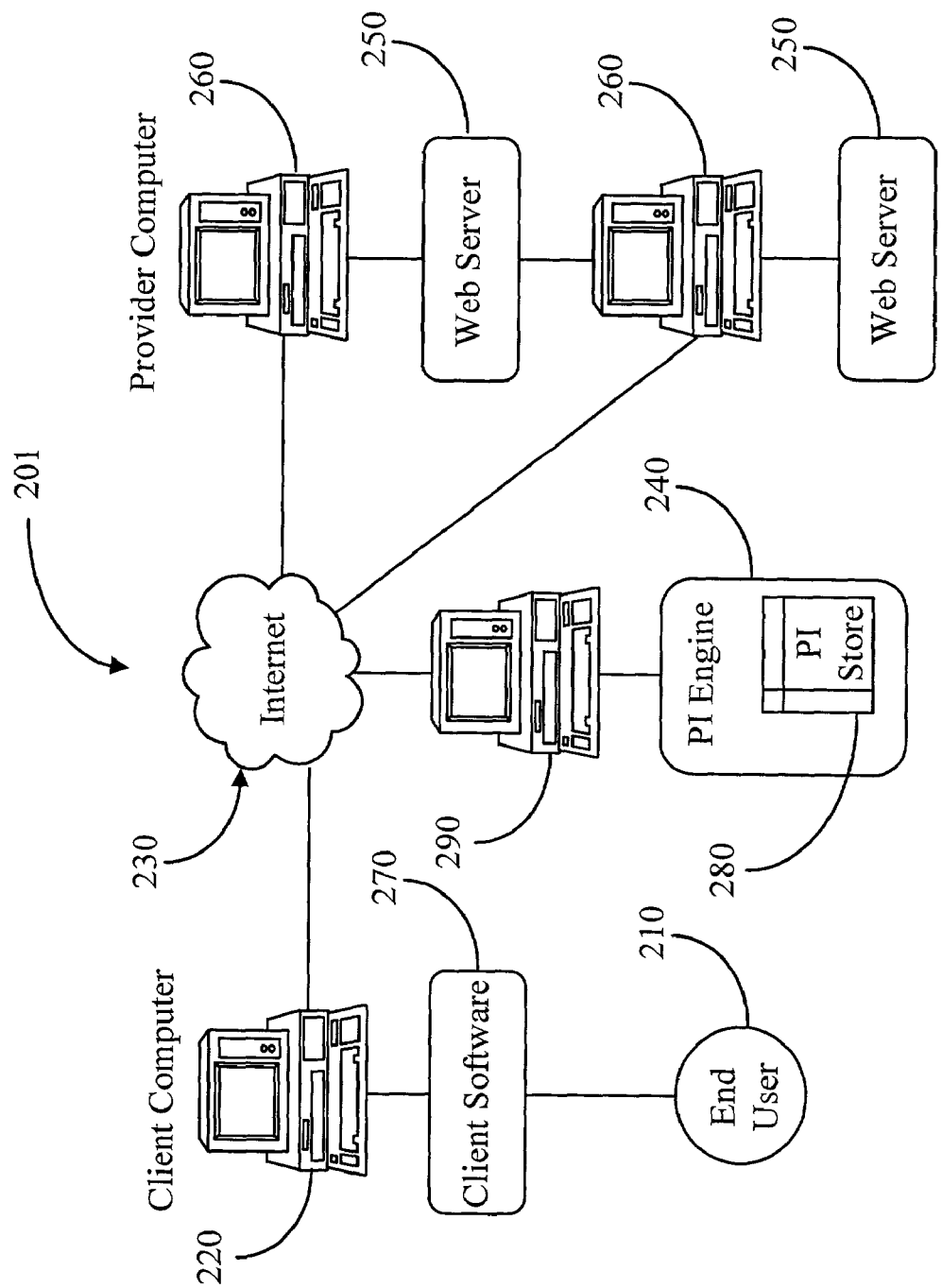
FIG. 2 is a block diagram of the components that could be used to implement present invention.

FIG. 2 provides a block diagram of components that could be used to implement the present invention. The end user 210 accesses a client computer 220 running client software 270 which in a particular embodiment could be a general Web browser such as Navigator or Communicator (Netscape). The client computer 220 utilizes the Internet 230 to access a PI engine 240 running on a PI host 290. The PI engine 240 examines stored PI 280 for freshness. Any stale PI items are refreshed by directly reacquiring the PI from the particular information provider's Web site 250 running on the provider's computer system 260 accessed across the Internet 230. The PI engine 240 stores the fresh PI in its store 280 and delivers the PI to a selected destination, in this instance across the Internet 230 to the client computer 220 which displays the information to the end user 210 using the client software 270. The PI engine 240 refreshes all stale PI in a like manner prior to forwarding the aggregated PI to both the store 280 and the delivery destination, the client computer 220 in this instance. The PI engine 240 may refresh the PI sequentially or in parallel. For example, the end user's checking account balance would be updated through his bank's Web site, his email from his particular email site, his portfolio information from his broker's site and his electricity bill from his electricity company's site.

Figure 3:
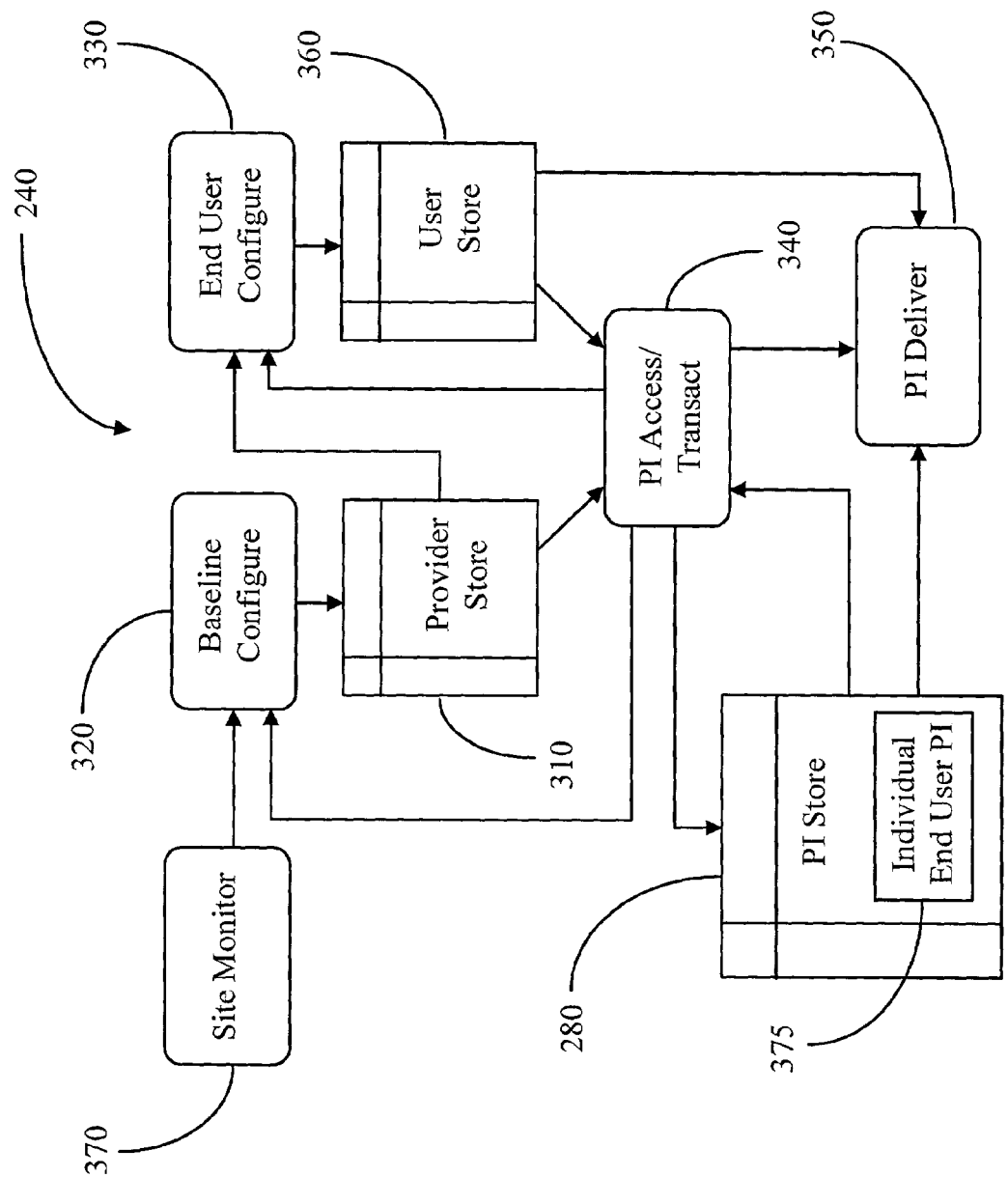
FIG. 3 is a block diagram of the components of the PI engine.
Figure 4:
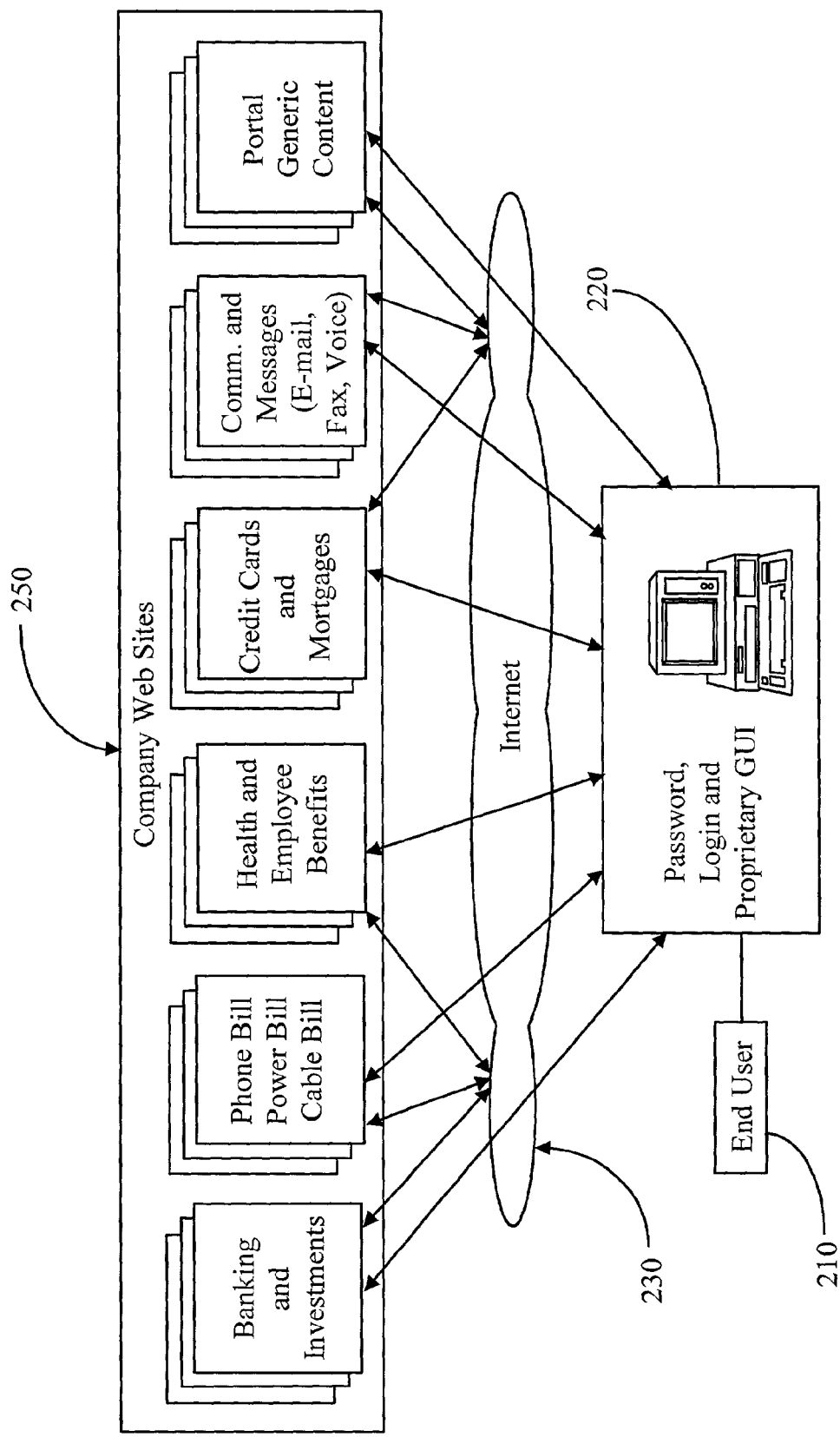
FIG. 4 is a diagram of the current PI access architecture.

FIG. 3 displays a block diagram of the components of the PI engine 240. The PI engine 240 is composed of both storage and processing components. The three primary storage components are the PI store 280, the PI Provider store 310 and the user store 360. The first storage component of the PI engine 240 is the PI store 280. The PI store 280 contains each individual's PI record 375; the PI associated with a particular end user is segregated from the PI of all other end users. The PI engine also utilizes a provider store 310 that maintains general parameters associated with particular PI providers. The general parameters of a PI provider define the types of verification data necessary and the procedures to be followed to gain access to the particular PI provider. Each PI provider record also contains the types of PI provided by the PI provider and the types of transactions supported by the provider. Along with the type of PI or transaction, the record also contains the additional types of data and procedures necessary to access the PI or execute the transaction. A user store 360 is also necessary to maintain configuration and verification information concerning particular end users. For each end user, the user selected PI providers, PI and transactions are registered along with the verification data necessary to acquire the PI or execute the transaction from the PI provider.

The PI store 280 may be implemented in a variety of ways. Referring to FIG. 2, the PI store 280 may comprise a database residing on the PI Host 290. Under this approach, the PI for each individual end user 210 is stored as a separate record or object 375 in the database. In yet another embodiment, the PI for each end user 210 could be stored in a separate file 375, thus performing the task of segregating PI of different users at the file level.

In addition, or as an alternative, the PI associated with each end user 210 may reside on his/her client computer 220 using cookie technology as specified in D. Kristol and L. Montulli, "HTTP State Management Mechanism", Request For Comments (RFC) 2109, February, 1997 (available at http://www.ietf.org/rfc/rfc2109.txt), which is expressly incorporated herein in its entirety. The PI associate with the end user 210 would be stored as PI cookies 375. This implementation mechanism provides inherent support for segregating PI associated with one end user 375 from PI associated with all other end users. Utilizing this method as a substitute for a centralized store provides a layer of security against unauthorized access. As a further measure, PI data stored in cookies could be stored in an encrypted format.

Figure 6:
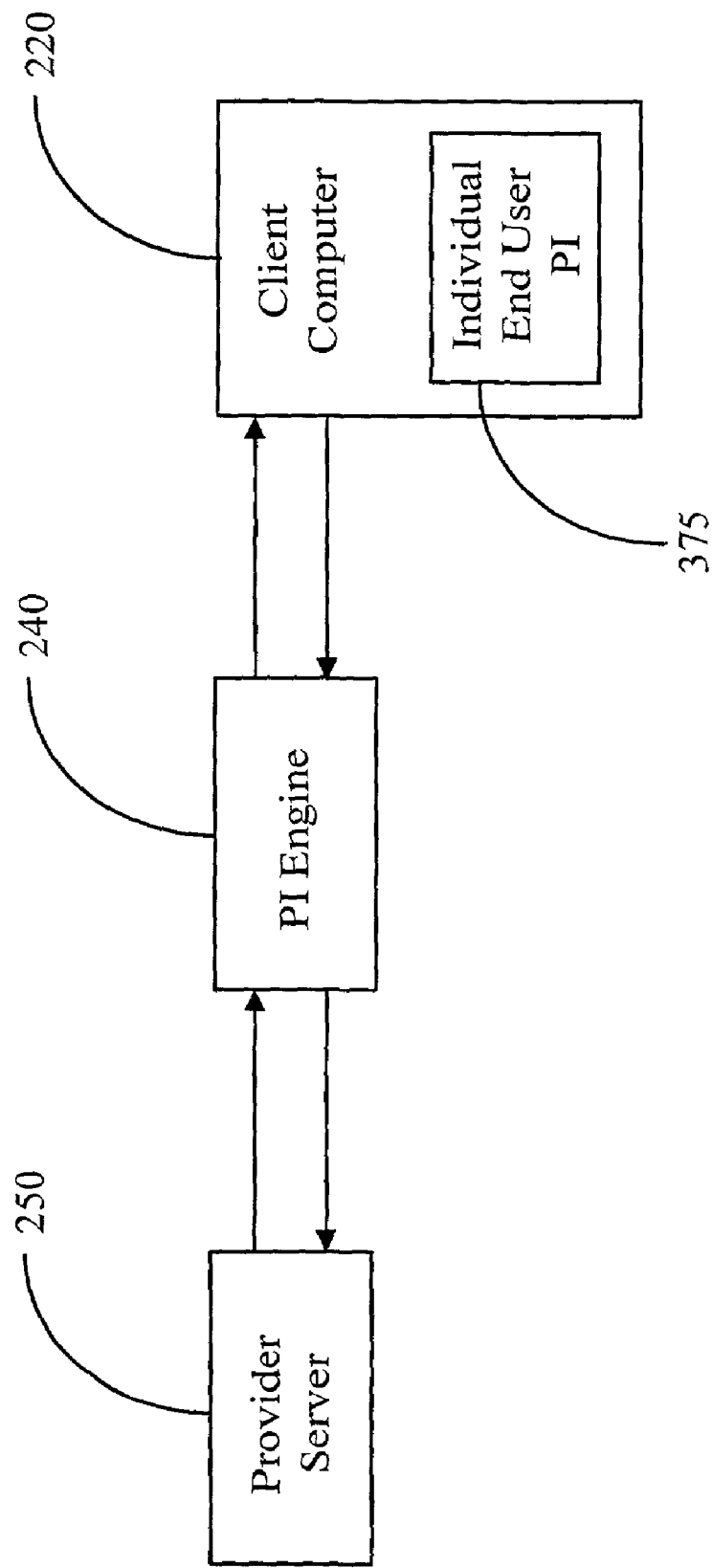
FIG. 6 is a diagram of the cookie/client cache architecture.

FIG. 6 provides a diagram of a typical implementation of the PI store 280 using cookie technology; references in the foregoing description are also made to FIG. 3 with respect to the internal workings of the PI engine 240. When an attempt is made to access PI by an end user 210 directly, or through an intermediary Web server, the PI access/transact component 340 of the PI engine 240 would retrieve stored PI 375 from the PI store 280. Under this approach, this stored PI 375 would be received directly from cookies sent by the client computer 220 of the end user 210. The PI access/transact component 340 would perform any decryption if necessary. Any updates required would be obtained by direct access of PI providers 250. The PI deliver component 350 would provide the mechanism for both updating the PI store 280 as well as transmitting the requested PI to the end user 210, directly or through an intermediary Web site. The PI deliver component 350 would place the updated PI in the PI store 280 by replacing the outdated PI cookies 375 stored on the client computer 220. The PI deliver component 350 would also handle any encryption if necessary. The PI deliver component 350 would also be responsible for transmitting requested PI. In a preferred embodiment, the PI store 280 would be implemented using this cookie-based architecture.

The user store 360 may be implemented in a variety of ways. Referring to FIG. 2, the user store 360 may comprise a database residing on the PI Host 290. Under this approach, the personal configuration data for each individual end user 210 is stored as a separate record or object in the database. In addition, or as an alternative, the end user data could be distributed in a manner similar to the cookie/cache architecture describe above with respect to the PI store 280.

In a preferred embodiment, the user store 360 could be implemented through personal information configuration (PIC) files. PIC files store a personal profile such as name, address, and social security number in secure, encrypted fashion for each end user. PIC files facilitate automatic registration of end users with information Providers via the end user configuration component 330. This component will read the PIC file and, using retrieved personal information, pre-populate registration templates for selected Providers. Then, it will prompt the user to enter required information that is missing from profile, if necessary. If the information is complete, the registration is automatically completed. Next, the end user configure component 330 completes any Provider registration forms, gets responses and updates the end user's PIC.

The four primary processing components access and manipulate the data in the three stores. The processing components may execute on a single processor, such as a file server computer system based on a Pentium class (MMX, PRO, II, III, etc.) central processing unit or an equivalent, or multiple processors. These four processing components are the Baseline configure component 320, the end user configure component 330, the PI access/transact component 340 and the PI delivery component 350 as seen in FIG. 3. The Baseline configure component 320 provides the interface by which new user selectable PI providers are added to the system. This component 320 might be implemented in a variety of ways including trial and error followed by manual entry of configuration information, semi-automated trial and error (automated location of Hypertext Markup Language (HTML) <FORM> elements, Javascript functions and Java applets) followed by manual entry of configuration information or, preferably, configuration by example (executing the protocol in a simulated Web client where the simulated Web client automatically generates a list of required data and a list of steps in the access process). These processes would be utilized at two levels: the first level being the set of data and steps required for general access to the particular PI provider and the second level being the set of additional data and steps required for accessing each particular piece of PI on the PI provider's site. The baseline configuration component 320 may be triggered independently when a new PI provider is added to the system, or it might be triggered as a result of a failure of the PI access/transact component 340 potentially indicating a change in access requirements for the failed access. This latter warning would more likely result where the PI access/transact component 340 has made a comparison between requirements supplied by the Provider store 310, both general to the PI provider and specific to the PI or transaction, and the end user data supplied by the user store 360 after seeking end user verification via a request of the end user to confirm the previously entered required access data via the end user configure component 330 and found an inconsistency. When an inconsistency is determined, updates to the Provider store 320 are made to bring the Provider data into conformance with current access/transaction requirements.

The end user configure component 330 allows an end user to select and configure PI and transactions of interest to the specific user. This configuration information is maintained in the user store 360. When an end user initially subscribes to the system according to the present invention, the system allows the user to select the types and sources of PI and/or transactions desired. First, the system requests permission from the end user to act on his behalf to obtain any selected PI and to execute any authorized transactions. Next, the system provides the user with a list of known information suppliers and the types of PI supplied from and transactions supported by the particular PI provider from the Provider store 320. The system requests the verification data necessary for accessing each selected PI provider and the additional data required by the particular PIs and/or transactions desired from that PI provider. Assuming the end user is already a registered user with the selected PI provider or the particular PI provider does not require prior registration, the data supplied by the end user is placed in the user store 360.

One method of obtaining any cookie data would be for the end user to access each previously accessed PI utilizing the PI engine 240 as a proxy server. The PI engine 240 would pass the cookie data to the PI provider site with the appropriate Web page requests to obtain the PI or execute the transaction and with the end user's permission retain a copy of the cookie data in the his record in the user store 360. An alternate means of obtaining the cookie data would be a direct upload of the cookie information from the end user's computer. In a preferred embodiment, no cookie data is necessary where a user is already registered with a provider. All that is necessary is the verification data for login.

If the end user does not have the requisite information because he is not a registered user of a selected PI provider, the user configure component 330 prompts the user for the information necessary to register the end user with the PI provider and performs the registration procedure required by the PI provider. A simulated Web client could perform this process automatically supplying the access data as required and sending any necessary cookie data. The manner in which such a simulated client registers the end user depends significantly upon the interaction method used on the PI provider Web site. If the Web site uses HTML forms and common gateway interface (CGI) applications, the end user configure component 330 can formulate a uniform resource locator (URL) to replicate the effect of actual form usage and submit this URL to the simulated Web client. The use of a URL to mimic an HTML form is equivalent to manually entering the data into the Web <FORM> element. See Kerven, Foust, Zakour, HTML 3.2 Plus How-To, Waite Group Press, 1997, pp. 559-569. If the Web site uses a mixture of HTML forms and Javascript functions, a simulated Web client with a modified Javascript interpreter could effectively register the user by following the end user registration process for the particular PI provider. The registration process to follow would be obtained from the record of the particular PI provider in the Provider store 320. The Javascript interpreter in the simulated Web client would follow this procedure and supply the data supplied by the end user. A similar process could be used if the registration process on the PI provider Web site utilizes a Java applet. A Web client with a modified Java bytecode interpreter could effectively register the user by following the end user registration process stored for the particular PI provider in the Provider store 320. The bytecode interpreter would supply the data previously entered by the end user rather than requiring interactive input from the end user. If the PI provider Web site utilizes a combination of forms, scripts and applets, the individual procedures above could be used in combination to accomplish the desired registration.

With reference to FIG. 2 and FIG. 3, a modification of the Java virtual machine (VM) could allow for automated interaction between the various functional components of the PI Engine 240 and Java applet available through provider Web servers 250. Templates for interacting with particular applets could reside in the Provider store 310. The specific input data utilized by such templates could be stored in the User store 360. When a functional component such as the end user configure 330 or the access/transact 340 components requires automated communication with a Java applet on a provider Web server 250, the modified Java VM would facilitate this interaction.

Figure 10:
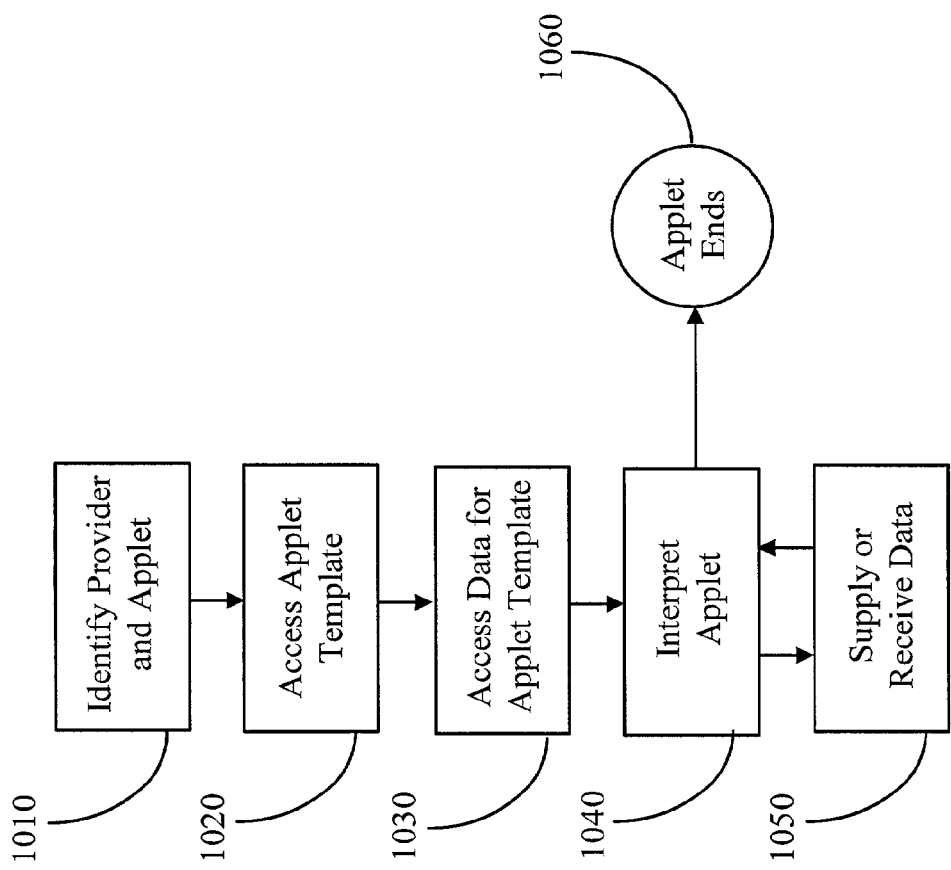
FIG. 10 illustrates a process for automated applet interaction utilizing a modified Java virtual machine.

FIG. 10 illustrates one process utilizing such a modified Java VM to achieve such automated interaction. The functional component requiring interaction identifies the provider and the particular applet on that provider with which the component needs to interact in step 1010. In step 1020, the component accesses the necessary template for interacting with the applet from the Provider store 310. Proceeding to step 1030, the component accesses the User store 360 to obtain the data required by the template. The modified Java VM interprets the applet in step 1040 and, rather than requiring interactive input from a user as in a normal Java applet execution, awaits input from or output to the interacting functional component of the PI engine. In step 1050, the functional component supplies input data to the modified Java VM according to the accessed template and retrieved data and receives output data according to the accessed template. Steps 1040 and 1050 repeat so long as additional input to or output from the applet continues. Upon termination of the applet, the functional component continues with its own processing in step 1060.

A successful registration could result in displaying the registration information to the end user for future reference. Further, the end user configure component 330 stores the requisite access verification data for the PI provider and the additional data required to access the selected PI or transaction in the user store 360.

In a preferred embodiment of such automated registration, any necessary cookie data would be accepted and stored as needed by the end user configure component 330. In many cases, cookie data is session specific and, therefore, of little long term utility. Cookies generated during the registration process are used solely during the registration process then discarded once registration is complete.

A failed registration could result from several situations. First, the end user attempting to register with the PI provider does not qualify for registration; for example, an end user attempting to register with a bank with whom the end user does not maintain an account and where the bank only allows access to account holders. Next, the end user may have supplied improper or incorrect information. For example, a bank registration process might require a social security number, a password, a bank account number and the maiden name of the end user's mother; if the user entered an incorrect social security number, the registration process would fail. Finally, the PI provider may have altered the registration procedure for its Web site. In this situation, following the process supplied from the Provider store 320 would yield a failed registration. In the instance of any registration failure, the end user could be presented with the data initially supplied to the system for registration. The system could then ask the end user to double check the correctness of the information provided and to correct and resubmit the data if an error is found. A second failure resulting from the submission of identical requisite data might generate an error message presented to the end user stating that either the end user is ineligible to access the selected PI from the selected PI provider or that alteration by the PI provider may have caused an error in registration. This second failure could also trigger a warning suggesting the need to potentially reconfigure the record for the PI provider in the Provider store 320.

Ultimately, the user store 360 would contain a record for each end user. This record as previous described could be a database entry, one or more cookies or a file such as a PIC file.

Each record would identify the selected PI providers along with the general access verification data needed and also under each PI provider would be a list of PI supplied and transactions supported by the particular PI provider of interest to the end user along with the additional data, if any, necessary to access that PI or execute that transaction. Specifically, duplicative information such as an end user's name would be centrally stored in the record once.

The end user configure component 330 also allows the end user to select one or more delivery destinations. One destination might be the end user's computer as exemplified by the client computer 220 running client software 270 in FIG. 2; however, a computer is not the only destination contemplated by the present invention. The destination for PI delivery could include facsimile, electronic mail, telephone, conventional mail, pager, other wireless device such as a Palm Pilot (3 Com), Web page or channel, Web browser or other delivery mechanism. The present invention also contemplates indirect access of PI by the end user utilizing a Web site as an intermediary; however, such indirect access would not require the end user to specify a delivery destination unless additional delivery options were desired.

Further, access to the end user configure component 330 may occur through direct access to the PI engine via the Internet as contemplated by the client computer 220 running client software 270 in FIG. 2; however, alternative methods of access are equally feasible. For example, the user might indirectly access the PI engine through the use of an intermediary Web site. A telephone interface to allow access to the end user configure component is another alternative.

With reference to FIG. 3, the PI access/transact component 340 supports the update, acquisition and transaction functionality of the PI engine 240. The PI access/transact component 340 is responsible for accessing and storing user PI and executing transactions authorized by the end user. When access or update is needed for a selected end user, the PI access/transact component 340 combines information from the Provider store 320 and the user store 360 to update end user PI in the PI store 280. For each piece of PI requiring access or update, the PI access/transact component 340 looks up the access procedure and information needed for the particular PI in the Provider store 320. The verification and access data is found in the user store 360. The PI access/transact component 340 utilizes this information to connect to the PI provider's Web site across the Internet and to access the PI. Where multiple pieces of PI require updating or access, the accesses may occur in series or parallel.

Requested transactions would be similarly supported. For each transaction, the PI access/transact component 340 combines information from the Provider store 320 and the user store 360 to perform the requested transaction. The PI access/transact component 340 looks up the transaction procedure and information needed for the particular transaction in the Provider store 320. The verification and access data is found in the user store 360. The PI access/transact component 340 utilizes this information to perform the transaction across the Internet from the PI provider's Web site A simulated Web client could perform access or transaction processes automatically supplying access and verification data as necessary. The manner in which such a simulated client access PI or execute transactions depends significantly upon the interaction method used on the PI provider Web site. If the Web site uses HTML forms and common gateway interface (CGI) applications, the PI access/transact component 340 can formulate a uniform resource locator (URL) to replicate the effect of actual form usage and submit this URL to the simulated Web client. The use of a URL to mimic an HTML form is equivalent to manually entering the data into the Web <FORM> element. See Kerven, Foust, Zakour, HTML 3.2 Plus How-To, Waite Group Press, 1997, pp. 559-569. If the Web site uses a mixture of HTML forms and Javascript functions, a simulated Web client with a modified Javascript interpreter could effectively access the PI or perform the transaction by following the PI access/transact process for the particular PI or transaction respectively. The access or transaction process to follow would be obtained from the record of the particular PI or transaction in the Provider store 320. The Javascript interpreter in the simulated Web client would follow this procedure and supply the data found in the user store 360. A similar process could be used if the PI provider Web site utilizes a Java applet. A Web client with a modified Java bytecode interpreter could effectively access PI or perform transactions by following process stored for the particular PI or transaction in the Provider store 320. The bytecode interpreter would supply the data from the user store 360 rather than requiring interactive input from the end user. If the PI provider Web site utilizes a combination of forms, scripts and applets, the individual procedures above could be used in combination to accomplish the desired access.

In a preferred embodiment of such automated accesses or transactions, any necessary cookie data would be accepted and stored as needed by the PI access/transact component 340. In many cases, cookie data is session specific and, therefore, of little long term utility. Cookies generated are used solely during these functions then discarded once the mining or transaction operation is complete.

In order to provide personal information to an end-user quickly after login, it is necessary for the PI access/transact component 340 to select an end user for data harvesting prior to the login of the end user. One approach to this solution is to update all of an end user's PI whenever the end user, directly or through an intermediary Web site, requests access to his/her PI. Another approach would be to update all of an end user's PI supplied by a particular provider whenever PI from that supplier is requested. Thus, the act of logging into the system by an end user effectively selects that end user for immediate PI update. However, this approach may result in the inefficient use of the PI Engine 240 resources.

Given the large number of potential users and providers, and the goal of providing the freshest data possible, another embodiment includes an algorithm developed to optimize the schedule in which end users are selected for data harvesting from a provider. This algorithm factors in the provider's update policy, the user's login habits, and the user-provider account characteristics. The proper application of the algorithm should ensure that PI is harvested as infrequently as possible for a given user, thus minimizing system resource consumption.

If the next provider update time and the next expected user login can be accurately predicted, a model can be created that will allow for smarter harvesting. Rather than harvesting data for all users of a provider at once when the provider updates its site, the harvesting can be spread out over time based on expected login times of users and network activity profiles. For example, if Provider A updates its site on Friday night and a large number of users of that provider are not expected to login again until Monday morning, the harvesting load can be distributed across multiple days. This has the advantage of minimizing both the peak loading of the PI Engine 240 as well as consumption of the provider's bandwidth by the PI Engine 240. To gain this optimization, the PI Engine 240 must maintain and refine models of each provider and user. Such data can be maintained in the provider store 310 and the user store 360 respectively.

Each time a user utilizes the PI Engine 240, the time and date may be captured. Once a sufficient number of login times are accumulated, they may be analyzed with respect to day of month, day of week, and time of day. These are used in a model to predict the next expected user login. The model is then tested and refined with subsequent logins until a measurable degree of confidence is established. Once high confidence is determined, the user model is incorporated into the adaptive harvesting scheduler. Until a high confidence level is reached for a particular end user one of the aforementioned harvesting approaches may be used.

Each provider updates its site based on policy driven by their unique resources and business model. For any adaptive scheduler to work, the policy for each provider must be modeled. In some cases, the policy is self-evident. In others, it must be determined empirically. A provider's policy will most likely fall into one of the following categories:

Type I. Updated periodically for all users
Type II. Updated periodically relative to each user
Type III. Updated in a pseudo-random manner The following three approaches may be used based upon provider type.

Type I Provider Policy Scheduling Algorithm

1. Assume users with a "no confidence" model have an immediate login time.
2. Order the users chronologically based on their predicted login time.
3. Shift the expected login time for all users back one hour.
4. Perform a density curve fit along temporal boundaries to get a polynomial function that can be used to determine the number of user accounts to harvest for a given epoch.
5. Perform an integral matching algorithm with the inverse of the network activity curve for the time period in question to adjust the distribution curve.
6. If possible, re-distribute peak harvesting time toward time zero to flatten the distribution curve.
7. Assign harvesting times to the sorted users according to the distribution curve.
8. Monitor time and harvest the user account when appropriate.

Type II Provider Policy Scheduling Algorithm

For each provider that falls into this category, an attribute of the user must be identified that determines when the personal information is updated. In some cases, the user may need to be queried for the information. In others, it can be determined from the harvested information. If the attribute cannot be established for a user via either of these means, the provider site may be monitored daily for changes in personal information until a pattern is established.

Since there is a natural, even distribution of accounts updated by a provider for a given day, a user's account can be harvested an hour before his expected login time. As in the Type I algorithm, users with a "no confidence" model should be immediately harvested.

Type III Provider Policy Scheduling Algorithm

This type of policy is the most difficult of all. Since the provider updates a user's account in a non-deterministic manner, a decision must be made for each provider as to the criticality of the information relative to the user. For those highly critical providers, each user account should be harvested daily, perhaps even more frequently. For those less critical providers, user accounts should be harvested less frequently and possible when overall system activity is low.

The PI deliver component 350 is responsible for formatting and delivering the PI to the end user. Usually delivery will only occur subsequent to updating all stale PI. The PI will be delivered to one or more destinations (e.g. facsimile, telephone, pager, Web browser, e-mail, etc.) as specified in the user store 360 except where the PI is accessed via an intermediary Web site. Where the destination is not an intermediary Web site, the PI deliver component 350 performs all formatting necessary to deliver the PI to the appropriate destinations. For example, where the destination is a Web browser, the PI would be formatted as an HTML document, or where the destination is a telephone, the PI would be submitted for voice synthesis and transmission.

Figure 5:
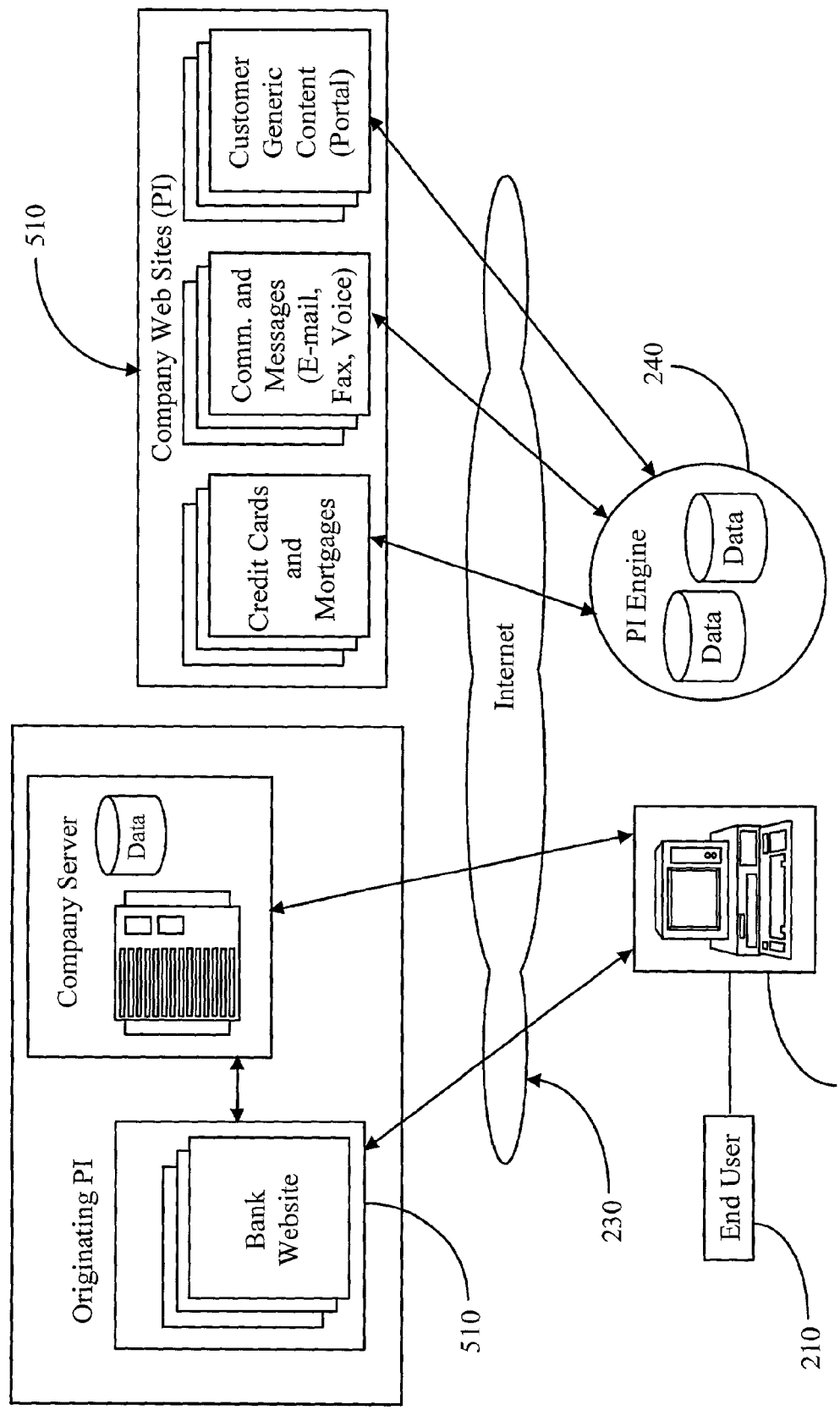
FIG. 5 is a diagram of an architecture supporting PI access utilizing an intermediary Web site.

In the case of an intermediary Web site, the PI is delivered in a format configurable by the intermediary Web site. FIG. 5 pictorial illustrates a possible embodiment of the current invention utilizing an intermediary Web site. An end user 210 utilizes a client computer 220 to access an intermediary Web site 510 across the Internet 230. The end user 210 logs into the intermediary Web site 510. The intermediary Web site 510 contacts the PI engine 240 across the Internet 230 and directly receives the end user's PI updated as required from the PI provider Web sites 250. The intermediary Web site 510 receives the PI, incorporates it into pages according to its particular formatting style and graphical user interface and delivers these pages to the end user 210. The use of the PI engine 240 is transparent to the end user 210. Further, an intermediary Web site 510 serving aggregate PI to an end user 210 may, and most likely will, simultaneously serve as a PI provider.

In another embodiment, this formatting occurs via a dynamic HTML generation system combining stylistic and layout information from a variety of sources. The PI deliver component 350 generates custom HTML pages dynamically. These pages are customized based on a number of stylistic factors (such as background color, foreground color, font size, color and style, page layout, etc) from a variety of sources and content from a variety of sources. Information providers, distributors, the end user, the PI deliver component 350 or any combination of these sources, or other relevant sources, may provide customization factors used in the page generation. Finally, each HTML page must be filled in with data. The data used in such pages may originate from such sources as information providers, distributors, the end user, the PI deliver component 350 or any combination of these sources, or other relevant sources. The required solution is a system representing a generic algorithm for performing such HTML generation at run-time. The style and content may be provided in any suitable format such as the Extensible Stylesheet Language (XSL), as specified by W3C in http://www.w3.org/TR/WD-xsl/, which is expressly incorporated herein by reference in its entirety, and/or the Extensible Markup Language (XML) as specified by W3C in http://www.w3.org/TR/REC-xml, which is expressly incorporated herein by reference in its entirety, or other suitable formatting standard. The key requirements for such a system are complete encapsulation of the problem domain and run-time efficiency.

Figure 8:
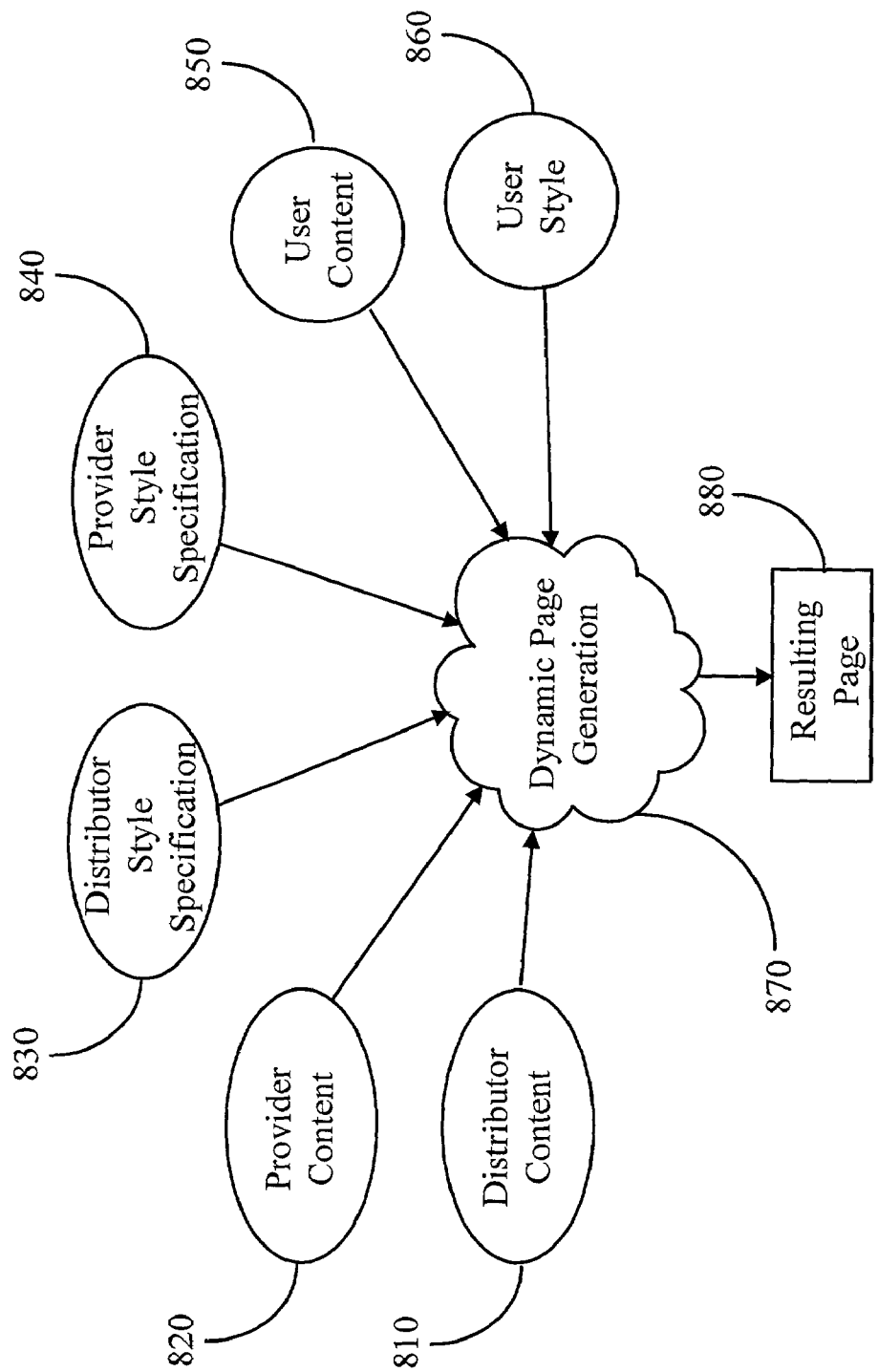
FIG. 8 depicts the integration model for the dynamic generation of HTML pages.

In preferred embodiments, the solution is based on the following basic model as depicted in FIG. 8:

1. Six sets of customization factors are identified: distributor content 810, provider content 820, distributor style specification 830, provider style specification 840, user-specific content 850 and user-specific style 860.
2. Each set of customization factors 810-860 is considered a separate, independent and required input to the run-time system 870 that performs dynamic page generation.

3. Each input 810-860 will be in form of an XML stream.
4. Output 880 will be in form of an HTML stream.
5. The dynamic page generation system 870 will produce valid output 880 for each set of six valid inputs 810-860.

Figure 9:
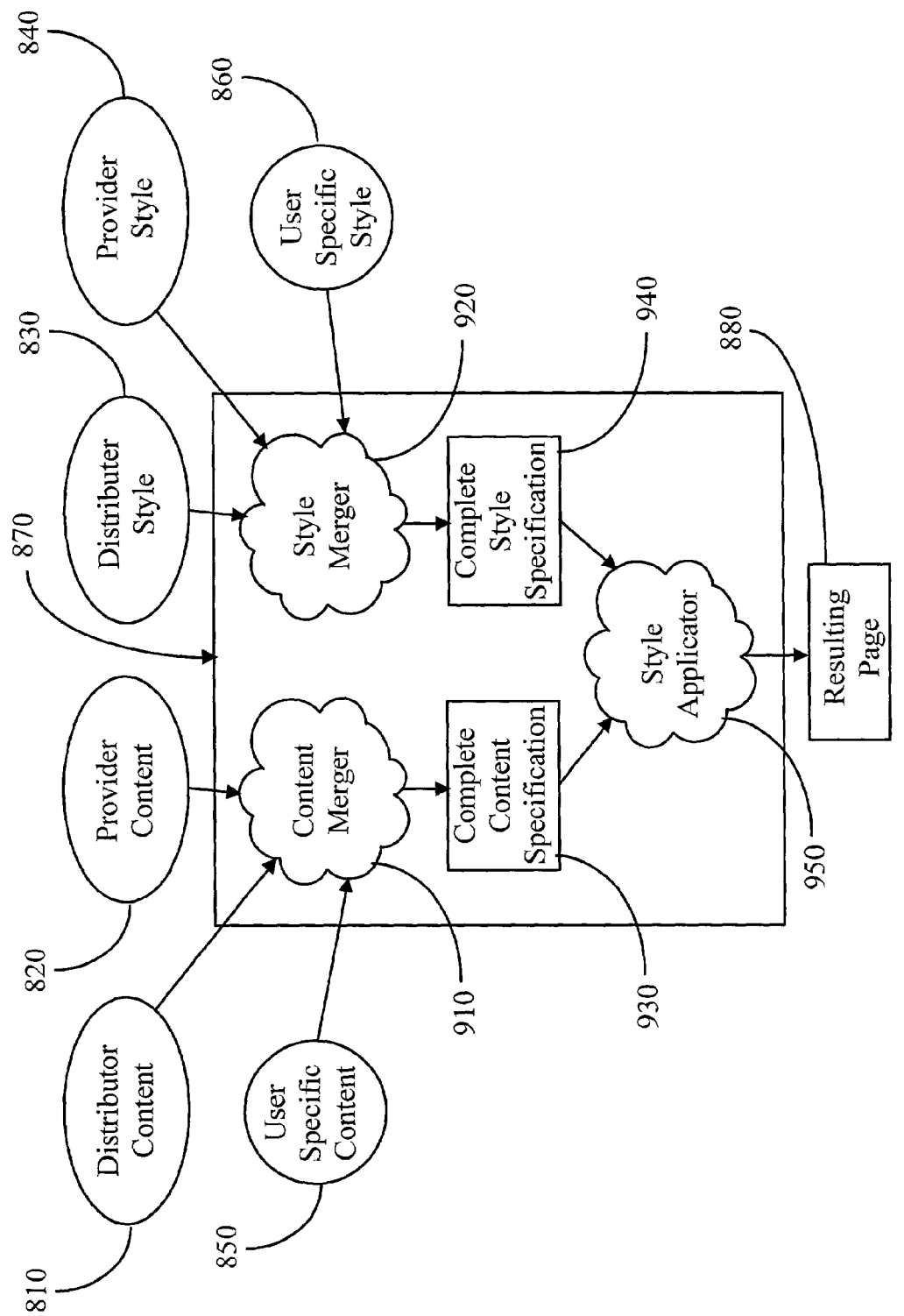
FIG. 9 displays the run-time process for dynamic generation of HTML page.

FIG. 9 illustrates an actual run-time sequence of input processing by such a system 870:

1. Distributor content 810 is combined with provider content 820 and with user-specific content 850 to produce a complete content specification 930 by the content merger unit 910.
2. Distributor style 830 is combined with provider style 840 and with user-specific style 860 to produce a complete style specification 940 by the style merger unit 920.
3. The style specification 940 is applied by the style applicator 950 to content specification 930 in order to produce the resulting page 880.

In order to completely encapsulate the problem domain, the following requirements must be placed on the system 870:

1. Each XML input 810-860 is a valid XML stream.
2. All content specifications 810, 820 and 850 are valid with respect to the same Document Type Definition.
3. All style specifications 830, 840 and 860 are valid with respect to the same Document Type Definition (such as the XSL DTD standard).
4. The merging units 910 and 920 whose task is to take two or more XML streams and produce a combined XML output must be able to produce such output for any set of valid XML inputs.

Another method of performing this task would be to format PI as HTML elements with predefined CLASS attributes. The intermediary Web site receiving these elements could dynamically include them in page forwarded to the end user of the PI. The pages incorporating such elements could include different style information associated with the predefined CLASS set. Level 1 cascading style sheet convention could be used to implement such configurability. See Kerven, Foust, Zakour, *HTML 3.2 Plus How-To*, Waite Group Press, 1997, pp. 651-693; Walsh, "An Introduction to Cascading Style Sheets," *World Wide Web Journal*, Winter 1997, pp. 147-156. This option requires minimal programmatic support by the intermediary Web site but restricts to some degree the intermediary Web sites flexibility in presenting the PI to the end user.

Alternatively, an intermediary Web site could develop an application utilizing a standardized application programming interface (API) to directly access the PI data. In this instance, the PI deliver component 350 could either be bypassed or potentially used as the component responsible for servicing API requests for data. Under this model, the intermediary Web site would be responsible for all formatting decisions with respect to the raw PI data. This implementation option requires additional programmatic support by the intermediary Web site but allows for greater flexibility in the use of the raw PI.

The ability to utilize an intermediate Web site to deliver PI is of significant utility. This capability allows an end user already familiar with an existing PI provider to access not only the PI associated with the particular PI provider but also all PI from other PI providers in the comfort of a familiar user interface, namely the existing PI provider Web site. In this situation, the request for PI would directly originate with the intermediary PI provider Web site and indirectly from the end user. Security measures would restrict access to authorized intermediate Web site access. These measure might include verification of the end user and the intermediate Web site. Further, verification of the association between the end user and the particular intermediate Web site might also be required for additional security.

In addition, the use of an intermediary Web site also supports a novel transaction model. In this transaction model, the intermediary site subsidizes, or fully compensates, the PI engine administrator for services provided to the end user. These transactions are facilitated via the auditing and tracking capabilities of the PI engine. These capabilities allow the calculation of per user fees, per transaction fees, per access fees or some combination thereof to be assessed. The assessed values could be directly charged to the intermediary Web site. Alternatively, such values could be debited from a minimum monthly fee charged to the intermediary Web site with any fees beyond the minimum charged directly to the intermediary Web site.

Figure 11:
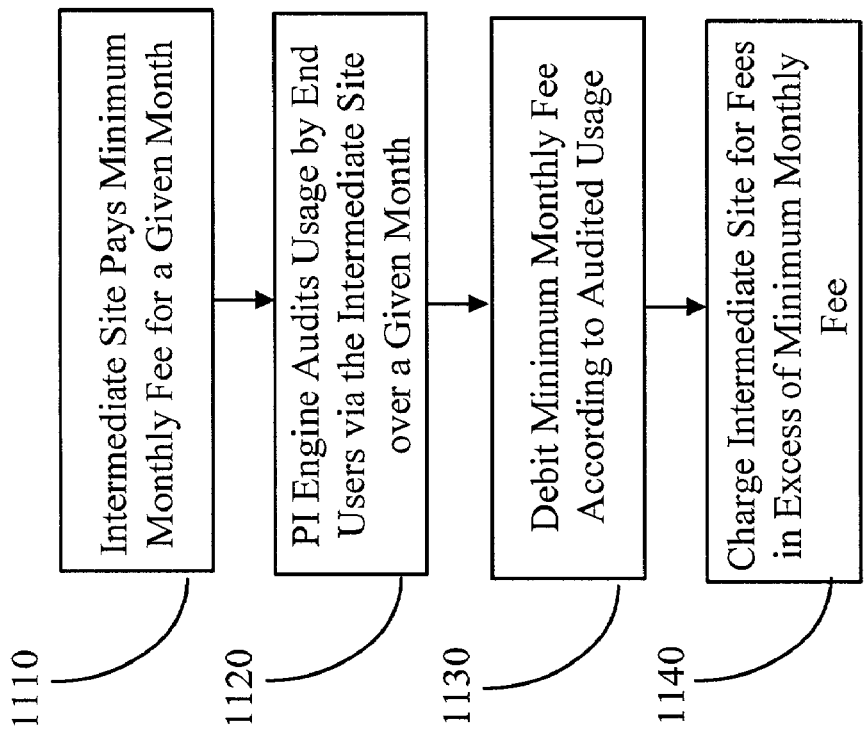
FIG. 11 is a flowchart exemplifying an intermediary Web site transaction structure.

FIG. 11 depicts a flowchart of a typical process according to the described model. The intermediary Web site pays a minimum monthly fee in step 1110. In step 1120, the PI engine audits and tracks end user usage via the intermediary Web site. The audited usage is used to assess a fee on a per user, per access, per transaction or combination basis. In step 1130, this audited amount is debited from the fee paid in step 1110. In step 1140, the intermediary Web site is charged for any fees in excess of the minimum fee paid.

Often an end user may require access to the underlying Web page generated by the provider of a particular piece of PI. The delivery component may deliver not only the PI but also an access point directly to the provider's page supplying that PI. The access point may take the form of a link, a form button or some other interactive access mechanism.

Figure 7:
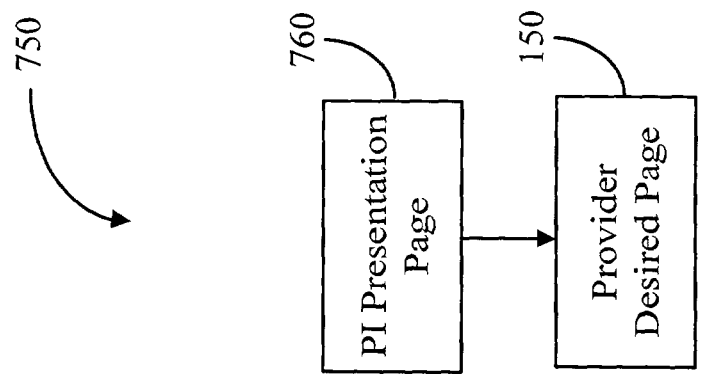
FIG. 7 is a flowchart for accessing pages underlying particular PI via the traditional process of FIG. 1 and via springboard technology.
Figure 7:
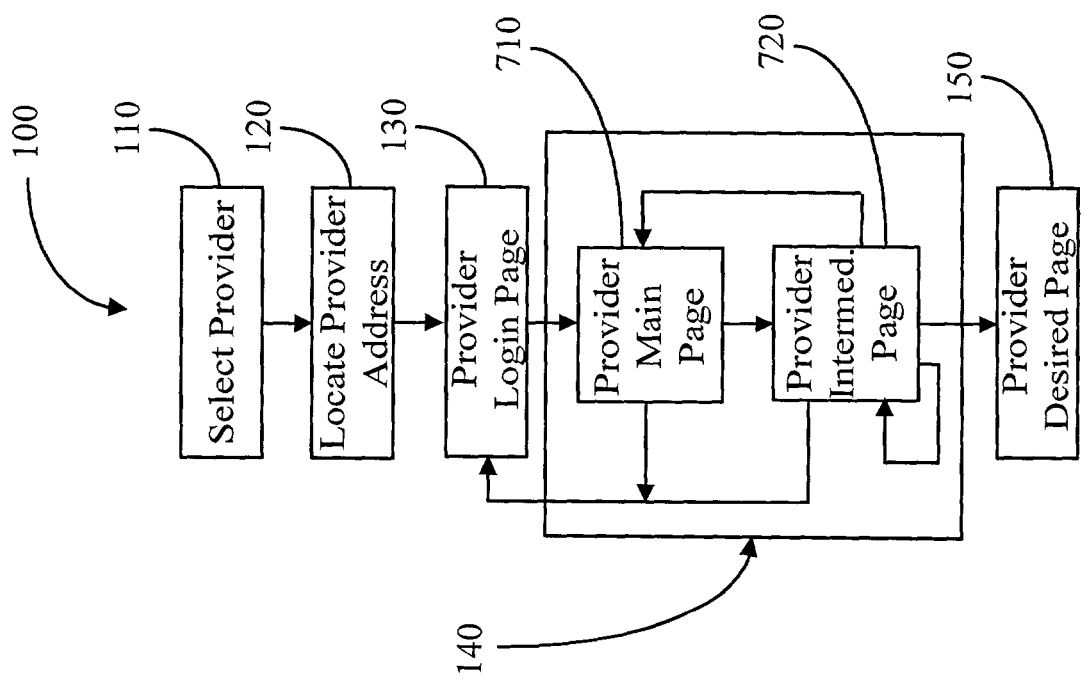

Such an access point significantly improves the efficiency of accessing the underlying page by the end user as exhibited by FIG. 7. In the traditional process 100 for accessing PI, the end user must proceed through numerous intermediary pages requiring a variety of often tedious interactions before reaching the desired page.

The end user must first identify the Provider 110. Next, the end user must locate the Provider's Web address 120. Then, the user the requests the Provider's login page 130. If the end user does not remember the requisite information, this information must be found, or the desired information will remain inaccessible via the Web. The end user then navigates the Provider's Web site 140. This often entails visiting the Provider's main page 710 followed by viewing a variety of intermediate pages on the Provider's site 720. The end user may have to backtrack several times to the main page 710 or accidentally leave the system entirely forcing a second login 140 before finally locating the desired information 150.

Utilizing springboard technology, the entire process 750 is streamlined into the single click of an access point. The delivery component of the PI Engine delivers an access point to the Provider's underlying page along with the PI. As a consequence, the end user need only perform a single interaction with the PI presentation page 760. This interaction immediately performs the requisite interactions with the Provider's Web site to bring the user to the desired underlying Web page 150.

In one embodiment, this springboard technology could be implemented utilizing a Java applet. With respect to FIG. 2, the applet would be downloaded from the PI Host 290 by the end user's client software 270, usually a Web browser, and executed locally by the end user's computer 220. The applet would drive the client software 270 to the desired page. Such an applet could retrieve procedures and data for driving the client software from the Provider store 310 and the User store 360.

In a further embodiment, the PI engine 240 could act as a proxy server directly accessing the Provider store 310 and the User store 360 as required. When the PI engine 240 receives the request to jump to the source of a particular piece of PI, the engine performs the necessary actions to navigate to the desire page and forwards the desired page to the end user's computer 220. Further interactions with the page might require additional proxying by the PI engine 240 as accumulated cookie data may reside on the PI Host 290. This embodiment is limited to use in handling standard HTTP traffic rather than secure HTTP traffic.

In a preferred embodiment, the springboard provides the end user with automated login into the PI Provider site 250 and allows the end user 210 to navigate via the client software 270. This automated login could be accomplished through the utilization of a hypertext transfer protocol (HTTP) redirect. Upon receiving the a springboard access request from the end user 210 via the client software 270, the PI Host 290 requests the login page from the PI Provider site 250 targeted by the springboard access. The PI engine 240 running on the PI Host 290 receives this login page and constructs a login request by accessing the proper data in the Provider store 310 and the User store 360. The login request is embedded in the HTTP redirect which is forward to the client software 270. The client software 270 is redirected to the targeted PI Provider site 250, and the end user 210 is automatically logged into this site.

Alternatively, this functionality could be implemented via a Java applet as described above. In addition, the PI engine 240 could generate a Javascript page containing the pertinent login request rather than an HTTP redirect. The Javascript page could be returned to the client software 270. This page would then be executed by the client software 270 to accomplish the automated login.

The PI engine 240 of FIG. 3 may also include a site monitor 370 processing component. This component would systematically monitor supported PI provider Web sites for changes. This component enhances the ability of the system to identify alterations in PI provider Web site procedures, data requirements and cookies requirements. This component increases system efficiency by supplementing or supplanting alteration identification via feedback from the PI access/transact component 340.

A further embodiment of the present invention might support the localize manipulation of PI. This could be accomplished where the client software 270 running on the client computer 220 in FIG. 2 is a specialized Web client rather than a general Web client such as Netscape. This specialized client might utilize Web channel technology to automate the local PI download and update processes. Where the PI store is implemented via the aforementioned cookie architecture, this specialized client may provide direct local access to stored PI.

In another embodiment, the PI engine 240 of FIG. 3 might support both system supported PI providers as well as PI providers specific to particular end users. In this embodiment, an end user is not limited to PI available from PI providers present in the Provider store 310. For an end user to add PI provided by a non-supported PI provider, the end user would access the Baseline configure component 320 and create a configuration for the non-supported PI provider. The PI provider and PI configuration along with the verification and access data would be stored along with the user's record in the user store 360.

A further embodiment of the present invention supports the inclusion of PI transaction procedures and access requirements in the Provider store 310 of FIG. 3. The end user specific information necessary to realize such a transaction would reside with the user record in the user store 360. The functionality of the PI access/transact component 340 would expand to support the performance of transactions. This additional functionality could be supported in a manner similar to the procedure described above with respect to performance of access utilizing a simulated Web client. A further feature of this embodiment would include automated or semi-automated account management by providing trigger events to automatically initiate a transaction.

For instance, with reference to FIG. 2 an end user 210 would be able to maintain his/her accounts online through the PI Engine 240. If an information provider has the capability of receiving payments online, the PI Engine 240 could support complete or partial automation of such transactions. If there is a billing due date for a certain information provider, PI Engine 240 could flag that information and send email to the end user 210 notifying him/her of the bill due. Thus, the user will not have to check each of his/her providers individually for due date information. The PI Engine 240 could also automated payments on a limited range of billing amount for providers who allow payments over their Web servers 260, then send an email to the user with the notification of payment.

Due date acquisition could be accomplished utilizing the PI access/transact component 340 seen in FIG. 3. The due date information would be available to the end user via any delivery means supported by the PI deliver component 350. The PI access/transact component 340 would use standard e-commerce bill-paying methods to pay the user's bill/s to the provider if he/she chooses. Once the bill is paid, then an email notification will be sent to the user with the provider information and payment information. The user can specify the range of amount stored in the user store 360 that will be paid automatically. If the bill exceeds the amount specified by the user, then PI engine will simply send out an email notification to the user instead of paying the bill automatically.

Syndicated Transaction Network

Aggregation of personal information (PI), and distributing the aggregated PI to end users through one or more destination sites has been described above in enabling detail. At the time of filing the present application, a well-designed system is in use by Yodlee.com, and the system has afforded customers extensive experience in the service, which has built customer confidence. Now new services are being added for the benefit of both information providers and end users. In the extension of new services, manufacturers and providers of services are being included in a manner that allows them to control the mix and look of services. Infrastructure is added in embodiments of the invention allowing providers to publish data and transaction protocols to and through the service.

Figure 12:
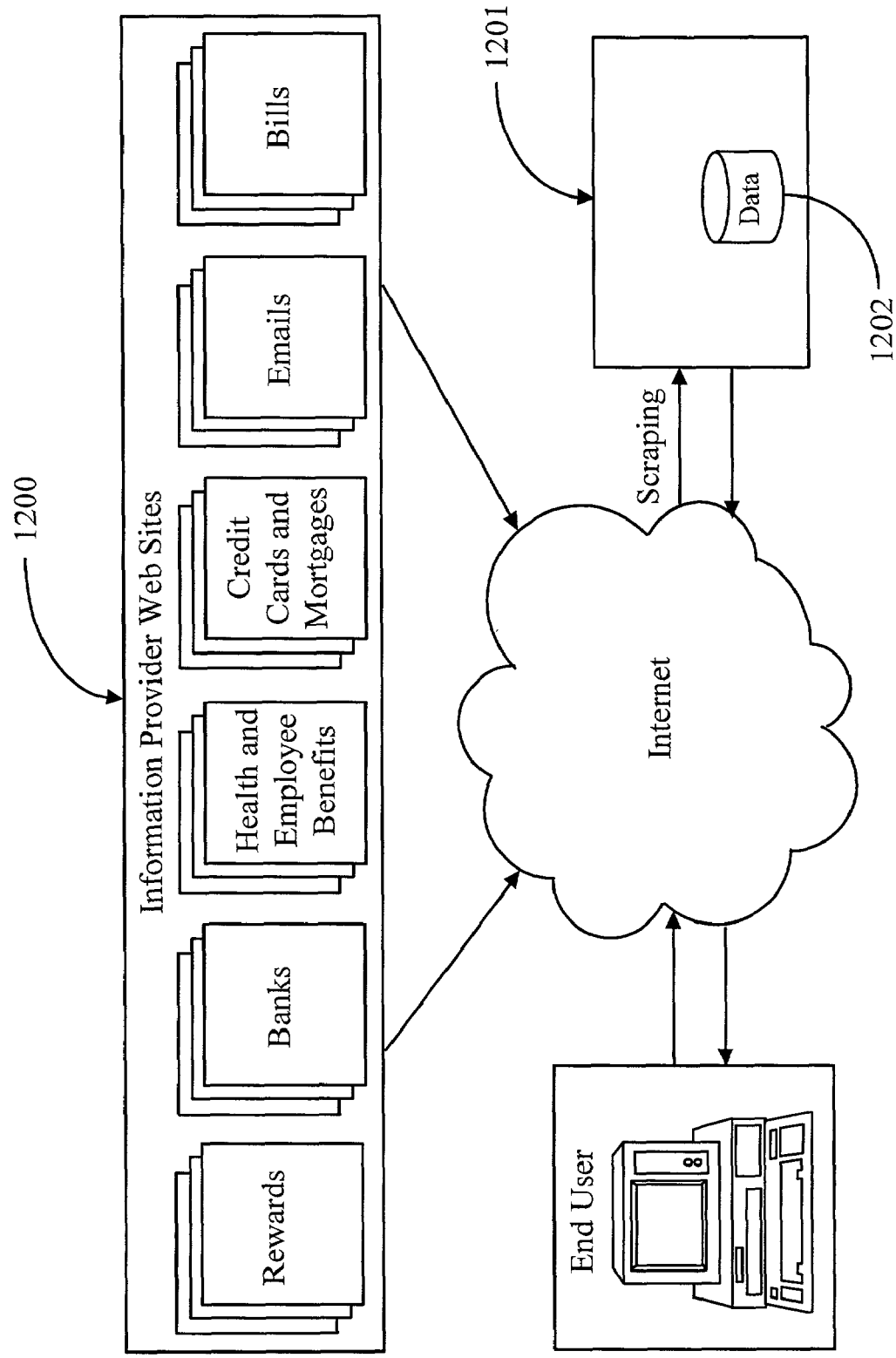
FIG. 12 is a diagram of a system for scraping PI, aggregating, and providing to end users through branded Web sites.

FIG. 12 is a diagram illustrating a basic level of service in aggregating and providing PI. In this basic model, providers 1200, including such enterprises as banks, brokerages, credit card companies, e-mail providers, reward providers, and bill paying services provide data to the service infrastructure. The service, in this model, represented by infrastructure 1201, pulls PI data from the providers under several sets of circumstances that have been described in more detail above. This is the process previously termed scraping. In this process, some data requires security identification of the persons for whom data is being scraped and aggregated.

In the model of FIG. 12 data is aggregated and consolidated in data repository 1202. Under several different scenarios aggregated data is delivered to subscribing end users. In some cases the distribution is directly from the service to the end user, and in other scenarios data is delivered through distributed Web sites, and in still others through branded Web sites. These alternatives are not shown in FIG. 12. The branded Web sites may be third party sites, wherein the data delivered by the service is then provided to subscribers of the third party's enterprise, typically transparent to the end user. That is, the end user does not know that the service of the invention is actually collecting and sending the aggregated data for distribution to the subscribers.

Figure 13:
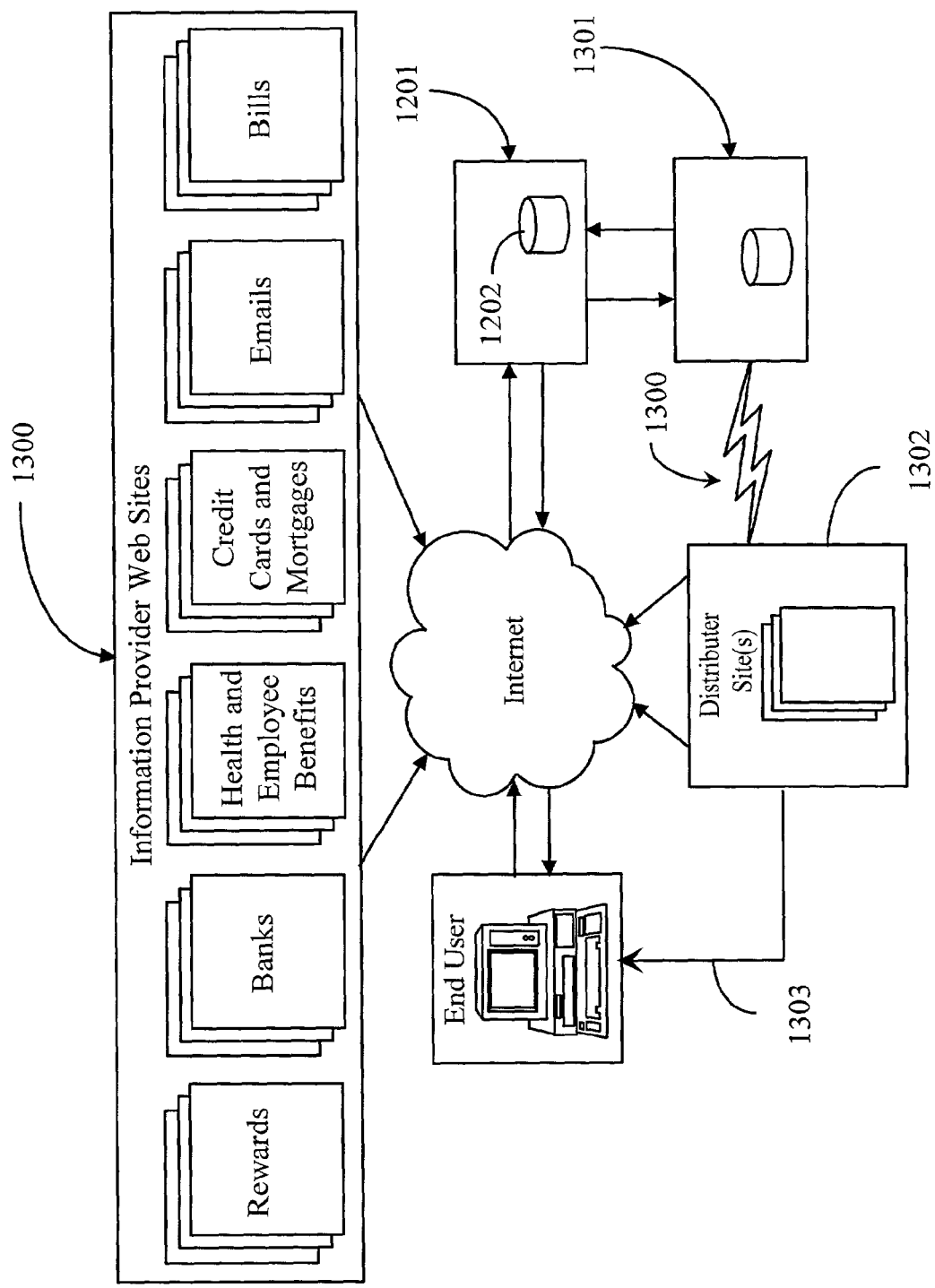
FIG. 13 is a diagram of a system for scraping PI, aggregating, and providing to third-party distributors for use in alternative strategies.

FIG. 13 is a diagram illustrating a wire service 1300 in addition to the elements and features shown in FIG. 12. In this enhancement, the service infrastructure is extended to include a structure 1301 for delivering data feed wire services to distributor Web sites 1302. In this embodiment the third party distributors build their own presentation subsystems, allowing the distributors to differentiate themselves. Also, delivery of the presentation may occur independently of device, such as by wireless feed to wireless-enabled devices (cell phones, PDAs and the like), set-top-boxes via cable services, and so on. Distributor sites 1302 may deliver through the Web to end users, or by land line or wireless services, represented by path 1303 independent of the Internet. This structure allows full participation of such as cell telephone enterprises, cable television providers, interactive television providers and so on.

Figure 14:
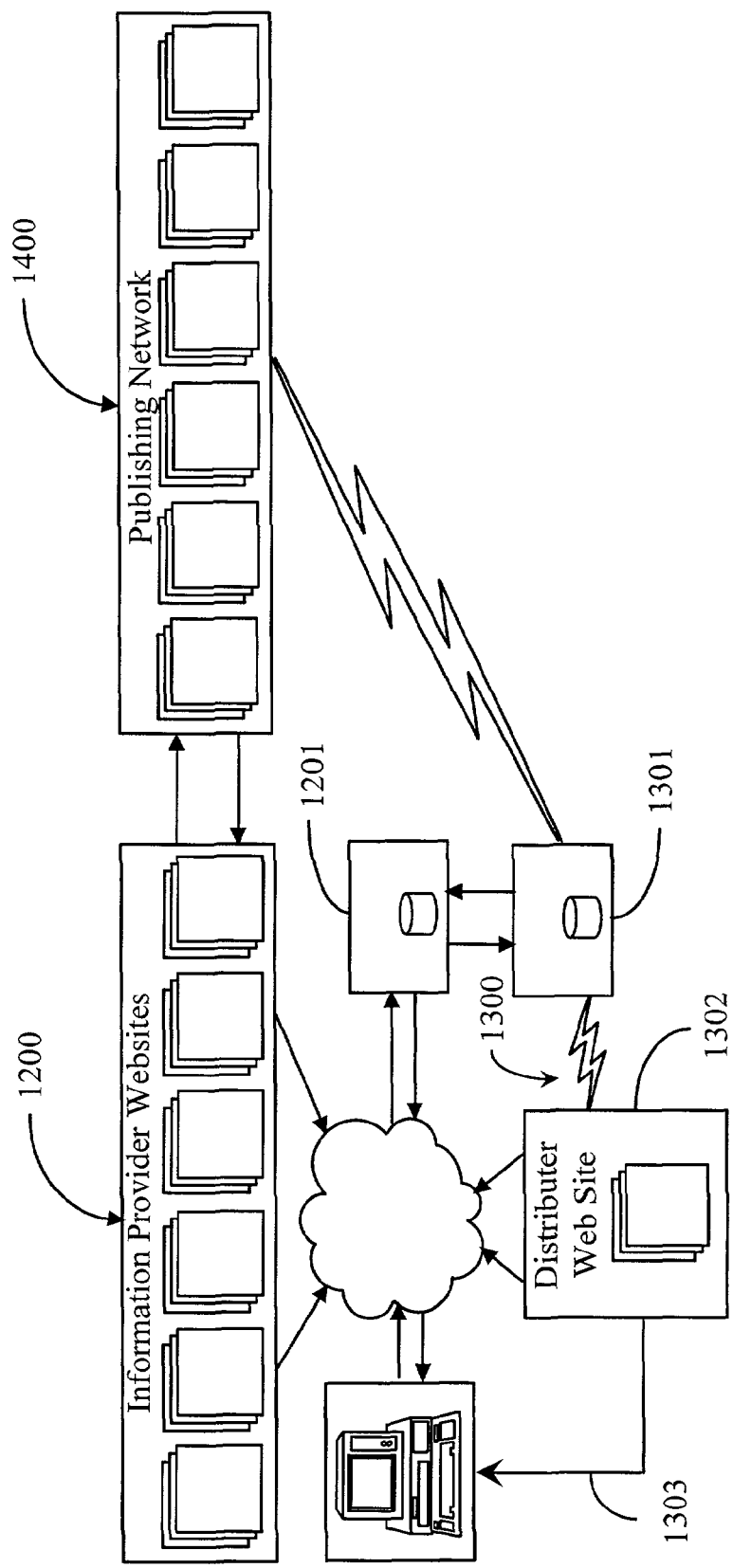
FIG. 14 is a diagram of a system for scraping PI, aggregating, and providing to distributors, with a system for allowing information providers to publish to the service.

FIG. 14 illustrates a further enhancement to the service and system wherein providers 1201 publish information through a publishing network 1400 to structure 1301 (which is enhanced to enable and manage this publication). In this embodiment providers may control what data gets scraped and aggregated based on a wide variety of criteria, such as the identity of the end user accessing the services, the point from which the end user accesses, and so forth, some of which was described above.

Figure 15:
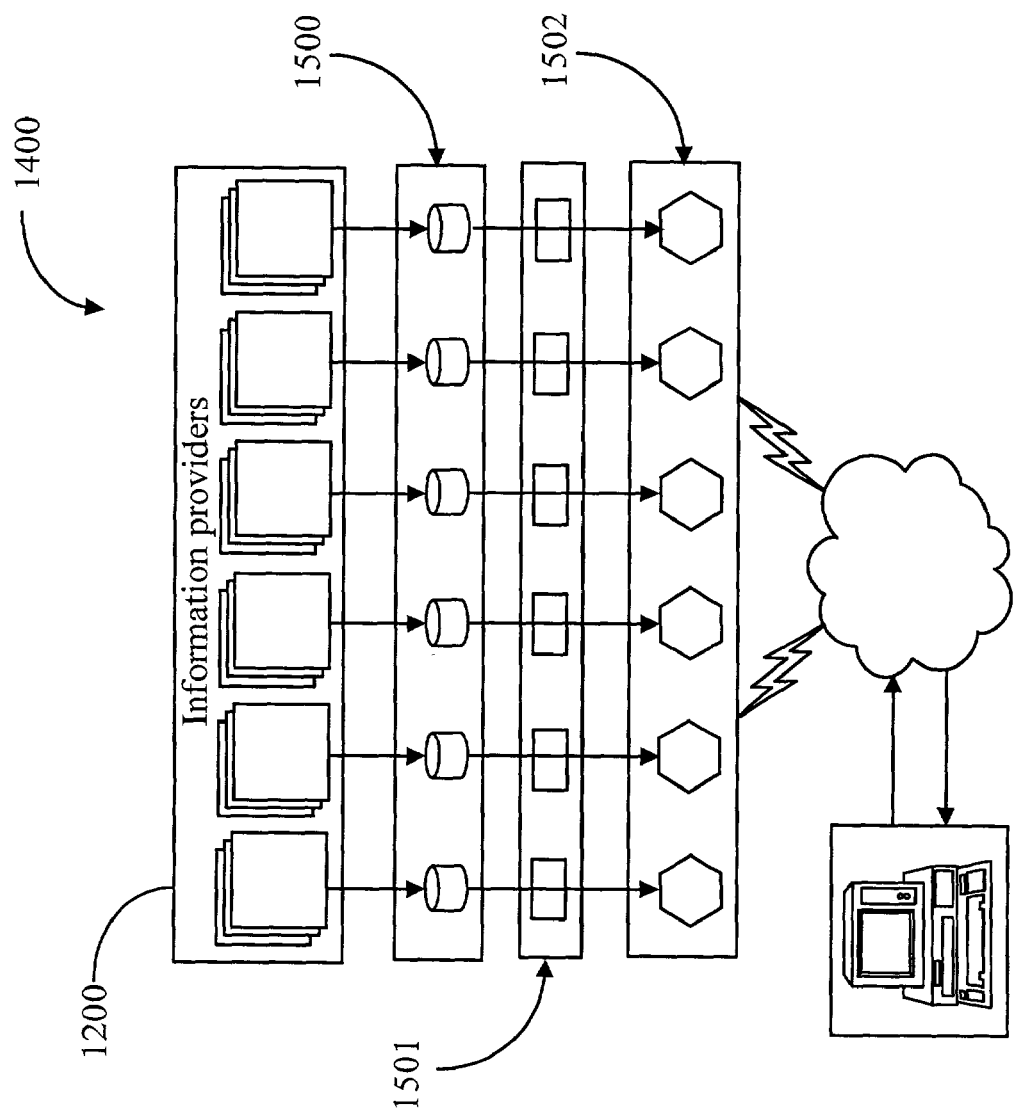
FIG. 15 is a diagram providing more detail of a publishing network.

FIG. 15 is a diagram illustrating additional detail in a preferred embodiment for publishing network 1400. In this embodiment information providers 1200 are assumed to have manageable data stores 1500. Custom code sets 1501, written in many cases by the providers themselves, extract data from the individual stores 1500 and map that data to application templates provided by the service. From that point data is managed in this embodiment by a set of downloadable servelets 1502 that map the data to standard templates, by which the data may be delivered to individual end users according to the format that such users need the data.

In this embodiment the service delivers servelets to providers and distributors that know how to communicate with the network infrastructure and to execute functions to transport data and transactions data, including instructions. Implementation choices include open source protocols and development environments, but could easily incorporate proprietary software packages to facilitate time-to-market issues. Examples are: XML interfaces; a Jini/JavaSpaces model; a downloadable sevelet to communicate and transact with the service network; open-source, published APIs; and automated provider provisioning.

Instead of simple publishing data through the service's network, providers may now, through the added capability, publish transaction protocols that allow the main service to proxy transactions on behalf of an end user. Also, the providers will have ultimate control over who, what when, and how for access to functionality to publish such transactions. Providers will be able to distinguish end users accessing the service as well as how they are accessing, and from where, and can use this information in access control.

As example of such capability is the concept of drag-and-drop services for performing transactions. In this case an end user may drag money from a provider's account and drop the money to another provider's account, to pay for virtually anything, such as paying a bill for a product or service, paying a utility bill, and so on.

Figure 16:
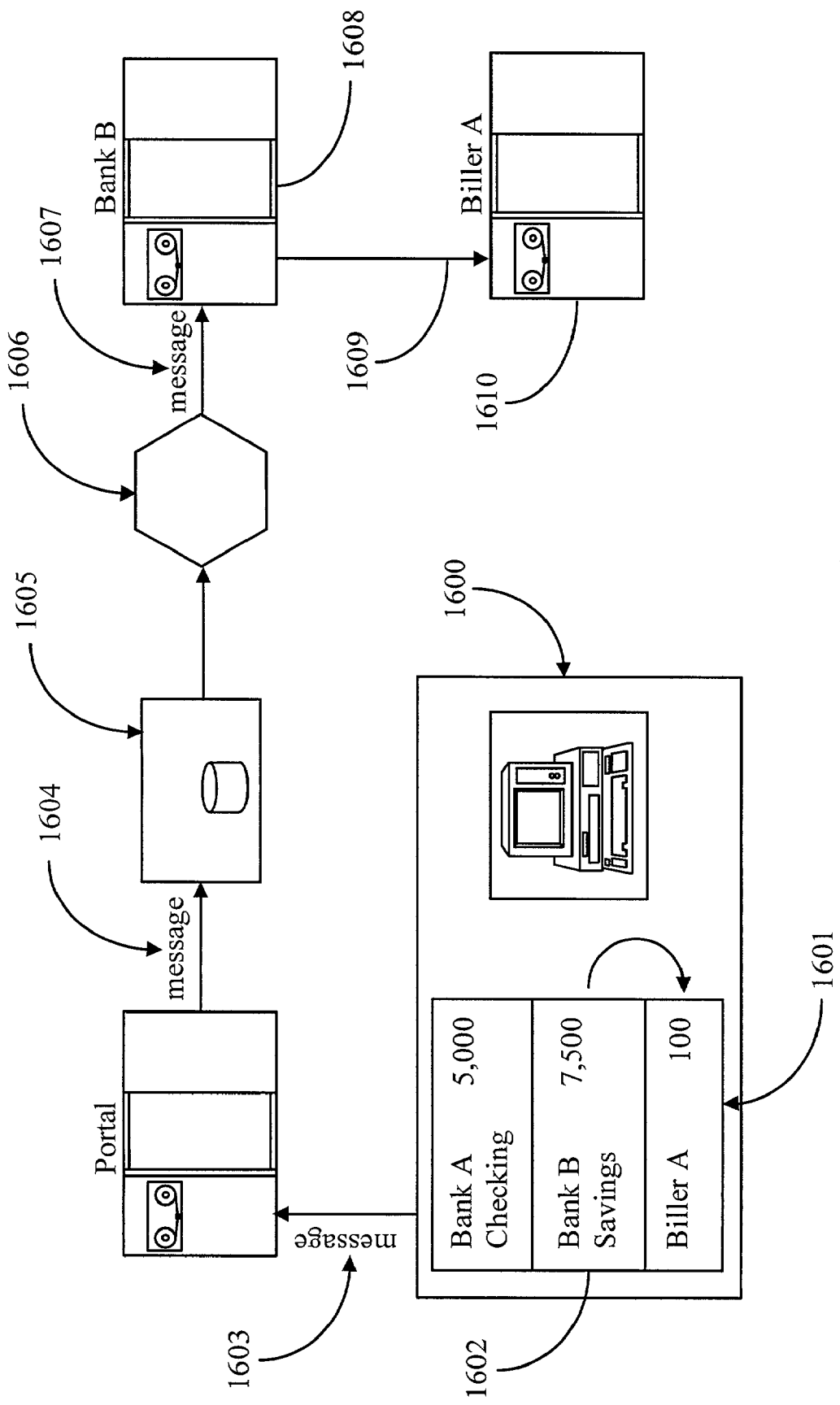
FIG. 16 is a diagram illustrating an architecture enabling drag and drop financial transactions in the system.

FIG. 16 illustrates a drag-and-drop example according to an embodiment of the present invention. The end user 1600 in this example has a user interface 1601; which is in this case an interactive browser-type display on his/her home computer. The end user's browser is in contact with displays provided by the service providing the infrastructure in embodiments of the invention, as described in much description above. To avoid confusion, the Service, as used herein, denotes the enterprise hosting integrated services provided for scraping PI, aggregating same, and providing PI and transaction services to end users, whether directly, or indirectly through third-party enterprises; and the associated infrastructure and software executing thereon.

Referring specifically to interface 1601, through features provided by the Service, contact has been made at some point with the end user's Bank A, and balances for two of the end-user's accounts, denoted herein Checking and Savings are shown. Interface 1601 also shows an amount owed to Biller A. Biller A, in some embodiments, through association with the end user, and through an information exchange, has knowledge of the end user's association with the service, and has submitted the bill for 100 to the Service. Alternatively, the biller may have sent the bill to the end user, and the end user has entered this bill to the Service.

The end user now may drag-and-drop (1602) from either account A or account B to the entry for Biller A. Hyperlinks associated with interface 1601 now form a message (command) 1603 to the Service to pay Biller A with money from Bank B, in this case from the Savings account. It is not necessary in the drag-and-drop for the user to specify an amount from the account, because the Biller A amount determines this parameter.

In this particular example the original message is shown as originating at the user's interface and going to Yahoo™. The Service, in this case, is being provided to the end user as a Yahoo™ subscriber, through Yahoo™ infrastructure. In other cases the features may be provided by the service directly to subscribers to the Service.

From Yahoo™ in this example, a message 1604 is sent on to the infrastructure 1605 of the Service. From this point communication is from the Service to a Servelet 1606 integrated with back-end systems operated by Bank B. An appropriately formatted message 1607 is then sent to Bank B 1608. The back-end system at Bank B then transfers the appropriate funds ($100 in this case), represented by path 1609, to Biller A 1610. There may be a variety of payment mechanisms, from a direct account transfer (same bank), to a wire transfer (different bank), to a personal check drafted by Bank B on behalf of user 1600.

It will be apparent to the skilled artisan that this is an example, and the structure of the system and the mechanisms may vary widely within the spirit and scope of the invention.

The embodiments described above are given as illustrative examples only. It will be readily appreciated that many deviations may be made from the specific embodiment disclosed in this specification without departing from the invention. Accordingly, the scope of the invention is to be determined by the claims below rather than being limited to the specifically described embodiments above.

What is claimed is:

1. An Internet-based syndicated transaction system, comprising:

a first enterprise hosting integrated transaction services automatically navigating to Web sites subscribed to by an end user scraping and aggregating personal information (PI) specific to the end user from network connected sites, and providing PI and transaction services to the end user;

a plurality of second enterprises maintaining each at least one financial account belonging to the end user in which the end user has a monetary balance, each of the second enterprises having a Web site accessible to the first enterprise via the Internet;

a plurality of third enterprises maintaining at least one billing account specific to the end user, each of the third enterprises having a Web site accessible to the first enterprise; and an interactive software graphical user interface (GUI) provided by the first enterprise and executable on an end user appliance, displaying an indication of PI including at least the monetary balance of the financial accounts and bills reflecting an amount owed by the user;

characterized in that the first enterprise automatically navigates to the Web sites of the plurality of second and third enterprises, logging into the Web sites on behalf of the user scraping and aggregating financial account and billing PI represented in the GUI and the user, through interaction with the GUI, initiates an instruction from the first enterprise to pay a bill at one of the plurality of third enterprises using funds from an associated financial account at one of the plurality of second enterprises by dragging the indication of the financial account to the indication of the bill or by dragging the indication of the bill to the indication of the financial account.

2. The system of claim 1 wherein the billing and financial account PI is periodically scraped, aggregated and stored at the first enterprise.

3. The system of claim 2 wherein the stored PI is provided to the user and the GUI upon user interaction with the GUI.

4. A method for enabling syndicated financial transactions at commercial institutions by a specific user, comprising the steps of:
(a) a first enterprise automatically navigating to Internet-connected Web sites subscribed to by the individual, logging into the Web sites on behalf of the user and collecting by the first enterprise, information reflecting at least a monetary balance of each of a plurality of financial accounts belonging to the individual;
(b) automatically navigating to and logging into the Web sites by the first enterprise on behalf of the user collecting information at billing accounts specific to the user and including bills associated with the billing account that are owed by the user;
(c) providing a software graphical user interface (GUI) executable on a user's appliance;
(d) presenting in the GUI an indication for each one of the plurality of the financial accounts associated with the user, and at least one indication of a bill owed by the user collected by the first enterprise; and
(e) generating an instruction via the GUI to the first enterprise to pay a bill using at least one of the financial accounts by dragging the indication of the financial account to the indication of the bill or by dragging an indication of the bill to the indication of the financial account.

5. The method of claim 4 wherein the GUI presents two or more indications representing bills due belonging to the user from two or more of the Web sites associated with the user.

6. The method of claim 4 wherein the billing and monetary balance information at the financial accounts are periodically collected and stored by the first enterprise.

7. The method of claim 6 wherein the stored billing and financial account information is provided to the user upon user interaction with the GUI.

* * * * *